United States Patent
Mukkera et al.

(10) Patent No.: US 12,192,993 B2
(45) Date of Patent: Jan. 7, 2025

(54) UPLINK CONTROL CHANNEL RESOURCE SELECTION FOR SCHEDULING REQUEST TRANSMISSION

(71) Applicant: QUALCOMM Incorporated, San Diego, CA (US)

(72) Inventors: Krishna Chaitanya Mukkera, San Diego, CA (US); Pranay Sudeep Rungta, New York City, NY (US); Ankita Maan, Hyderabad (IN); Yang Yi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/731,406

(22) Filed: Apr. 28, 2022

(65) Prior Publication Data
US 2023/0354309 A1     Nov. 2, 2023

(51) Int. Cl.
*H04W 72/12* (2023.01)
*H04L 27/26* (2006.01)
*H04W 72/02* (2009.01)
*H04W 72/1268* (2023.01)
*H04W 72/20* (2023.01)

(52) U.S. Cl.
CPC ... *H04W 72/1268* (2013.01); *H04L 27/26025* (2021.01); *H04W 72/02* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 9,354,683 B2 * | 5/2016 | Patiejunas | G06F 1/266 |
| 12,035,404 B2 * | 7/2024 | Cirik | H04B 17/327 |
| 2018/0013533 A1 * | 1/2018 | Yang | H04L 5/0053 |
| 2019/0349061 A1 * | 11/2019 | Cirik | H04L 1/1861 |
| 2021/0287157 A1 * | 9/2021 | Aditya | G06Q 10/06393 |
| 2021/0306828 A1 * | 9/2021 | Panteleev | H04W 72/0446 |
| 2022/0007300 A1 | 1/2022 | Zacharias et al. | |

(Continued)

OTHER PUBLICATIONS

International Search Report and Written Opinion—PCT/US2023/065736—ISA/EPO—Jul. 14, 2023.

*Primary Examiner* — Brandon M Renner
(74) *Attorney, Agent, or Firm* — QUALCOMM IP DEPT.; James Hunt Yancey, Jr.

(57) ABSTRACT

Methods, systems, and devices for wireless communications are described. Some wireless communications systems may support techniques for a user equipment (UE) to select a scheduling request resource from multiple scheduling request resources allocated across different cells based on one or more conditions. The UE may receive control signaling that indicates a first scheduling request resource on a first cell and a second scheduling request resource on a second cell. The UE may generate a scheduling request applicable to the first and second scheduling request resources. The UE may select the first scheduling request resource for transmission of the scheduling request on the first cell based on one or more of a power mode of the UE, a signal metric associated with the first cell, or a numerology of the first cell. The UE may transmit the scheduling request via the first resource on the first cell based on the selecting.

30 Claims, 12 Drawing Sheets

(56) References Cited

U.S. PATENT DOCUMENTS

2022/0038244 A1\* 2/2022 Zhang ................... H04L 1/1861
2022/0210777 A1\* 6/2022 Li ....................... H04W 72/044
2022/0287074 A1\* 9/2022 Bai ................... H04W 72/1268
2023/0010688 A1\* 1/2023 Wang .................... H04L 1/1614

\* cited by examiner

UPLINK CONTROL CHANNEL RESOURCE SELECTION FOR SCHEDULING REQUEST TRANSMISSION

FIELD OF TECHNOLOGY

The following relates to wireless communication, including uplink control channel resource selection for scheduling request transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a UE may transmit a scheduling request to request resources for an uplink transmission by the UE. The UE may transmit the scheduling request via one or more physical uplink control channel (PUCCH) resources indicated via a scheduling request configuration.

SUMMARY

The described techniques relate to improved methods, systems, devices, and apparatuses that support uplink control channel resource selection for scheduling request transmission. In some wireless communications systems, a user equipment (UE) may be configured to communicate with a network over multiple cells (e.g., a primary cell (PCell), a secondary cell (SCell), a secondary cell of a master or secondary cell group (SpCell), another type of cell, or any combination thereof). A network entity may transmit control signaling to the UE to allocate scheduling request resources (e.g., physical uplink control channel (PUCCH) resources) for the UE across the cells. In some aspects, the UE may generate a scheduling request at a first time, and there may be available scheduling request resources allocated on multiple cells at the same time, or within a time period of the first time. Generally, the described techniques may provide a mechanism for the UE to select between the multiple available scheduling request resources on different cells for transmission of the scheduling request.

The UE may select a scheduling request resource from the multiple scheduling request resources indicated via the control signaling for transmission of the scheduling request based on one or more parameters or conditions associated with the UE, associated with the cells corresponding to the one or more scheduling request resources, or both. For example, the scheduling request resource selection may be based on a power mode of the UE (e.g., a low power mode), a relative signal metric (e.g., reference signal received power (RSRP)) associated with the cells, a relative numerology of the cells, or a combination thereof. The UE may transmit the scheduling request via the selected scheduling request resource on the corresponding cell. The selection of the scheduling request resource based on the one or more conditions or parameters may provide for reduced ambiguity, which may reduce latency and improve reliability and throughput of the scheduling request transmission.

A method for wireless communication at a UE is described. The method may include receiving control signaling that indicates a first scheduling request resource on a first cell and a second scheduling request resource on a second cell, generating a scheduling request at the UE, where both the first scheduling request resource on the first cell and the second scheduling request resource on the second cell are applicable to the scheduling request, selecting the first scheduling request resource for transmission of the scheduling request on the first cell based on one or more of: a power mode of the UE, a signal metric associated with the first cell, or a numerology of the first cell, and transmitting the scheduling request via the first scheduling request resource on the first cell based on the selecting.

An apparatus for wireless communication at a UE is described. The apparatus may include a processor, memory coupled with the processor, and instructions stored in the memory. The instructions may be executable by the processor to cause the apparatus to receive control signaling that indicates a first scheduling request resource on a first cell and a second scheduling request resource on a second cell, generate a scheduling request at the UE, where both the first scheduling request resource on the first cell and the second scheduling request resource on the second cell are applicable to the scheduling request, select the first scheduling request resource for transmission of the scheduling request on the first cell based on one or more of: a power mode of the UE, a signal metric associated with the first cell, or a numerology of the first cell, and transmit the scheduling request via the first scheduling request resource on the first cell based on the selecting.

Another apparatus for wireless communication at a UE is described. The apparatus may include means for receiving control signaling that indicates a first scheduling request resource on a first cell and a second scheduling request resource on a second cell, means for generating a scheduling request at the UE, where both the first scheduling request resource on the first cell and the second scheduling request resource on the second cell are applicable to the scheduling request, means for selecting the first scheduling request resource for transmission of the scheduling request on the first cell based on one or more of: a power mode of the UE, a signal metric associated with the first cell, or a numerology of the first cell, and means for transmitting the scheduling request via the first scheduling request resource on the first cell based on the selecting.

A non-transitory computer-readable medium storing code for wireless communication at a UE is described. The code may include instructions executable by a processor to receive control signaling that indicates a first scheduling request resource on a first cell and a second scheduling request resource on a second cell, generate a scheduling request at the UE, where both the first scheduling request resource on the first cell and the second scheduling request resource on the second cell are applicable to the scheduling request, select the first scheduling request resource for transmission of the scheduling request on the first cell based on one or more of: a power mode of the UE, a signal metric associated with the first cell, or a numerology of the first cell, and transmit the scheduling request via the first scheduling request resource on the first cell based on the selecting.

Some examples of the method, apparatuses, and non-transitory computer-readable medium described herein may further include operations, features, means, or instructions for operating in a reduced power mode, where selecting the first scheduling request resource may be based on operating in the reduced power mode.

In some examples of the method, apparatuses, and non-transitory computer-readable medium described herein, selecting the first scheduling request resource may include operations, features, means, or instructions for selecting the first scheduling request resource based on a type of the first cell associated with the first scheduling request resource.

In some examples of the method, apparatuses, and non-transitory computer-readable medium described herein, the type of the first cell may be an SpCell and selecting the first scheduling request resource may be based on the type of the first cell being the SpCell.

In some examples of the method, apparatuses, and non-transitory computer-readable medium described herein, selecting the first scheduling request resource may include operations, features, means, or instructions for selecting the first scheduling request resource based on the signal metric associated with the first cell being greater than a second signal metric associated with the second cell.

Some examples of the method, apparatuses, and non-transitory computer-readable medium described herein may further include operations, features, means, or instructions for receiving one or more reference signals via the first cell and the second cell and measuring the signal metric associated with the first cell and the second signal metric associated with the second cell based on the one or more reference signals, where selecting the first scheduling request resource may be based on the measuring.

In some examples of the method, apparatuses, and non-transitory computer-readable medium described herein, transmitting the scheduling request may include operations, features, means, or instructions for transmitting the scheduling request according to a first transmission power, the first transmission power based on a value of the signal metric.

In some examples of the method, apparatuses, and non-transitory computer-readable medium described herein, the signal metric and the second signal metric include RSRP metrics.

In some examples of the method, apparatuses, and non-transitory computer-readable medium described herein, selecting the first scheduling request resource may include operations, features, means, or instructions for selecting the first scheduling request resource based on the numerology of the first cell being greater than or equal to a numerology of the second cell.

In some examples of the method, apparatuses, and non-transitory computer-readable medium described herein, selecting the first scheduling request resource may include operations, features, means, or instructions for selecting the first scheduling request resource based on a type of the first cell.

In some examples of the method, apparatuses, and non-transitory computer-readable medium described herein, the first scheduling request resource and the second scheduling request resource may be at least partially overlapping in time. In some examples of the method, apparatuses, and non-transitory computer-readable medium described herein, the first scheduling request resource and the second scheduling request resource may be non-overlapping in time.

In some examples of the method, apparatuses, and non-transitory computer-readable medium described herein, the control signaling may indicate a same scheduling request identifier (ID) for the first scheduling request resource and the second scheduling request resource, generating the scheduling request may be based on the same scheduling request ID, and the selecting may be based on both the first scheduling request resource and the second scheduling request resource being associated with the same scheduling request ID as the scheduling request.

DETAILED DESCRIPTION

Figure 1:
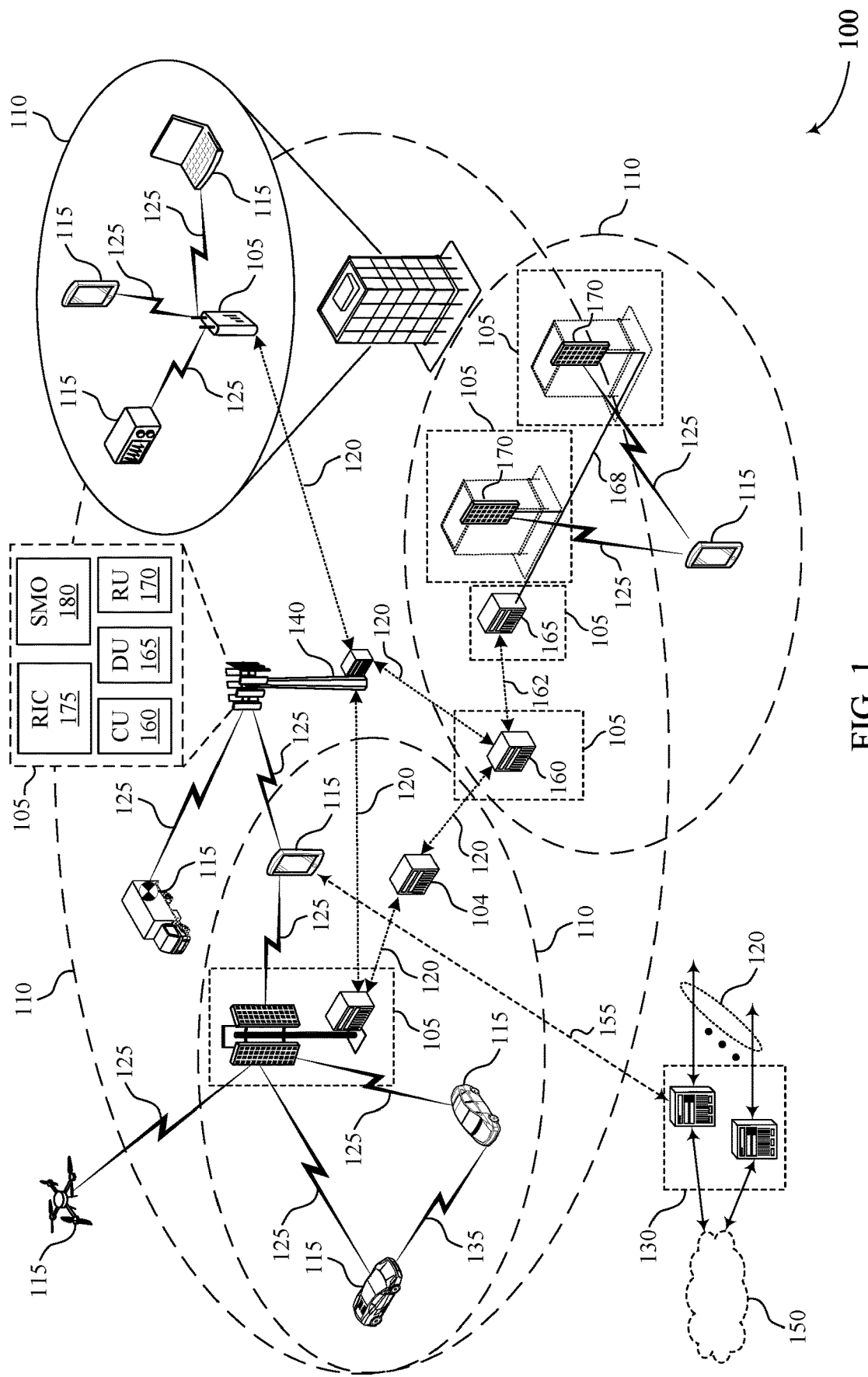
FIG. 1 illustrates an example of a wireless communications system that supports uplink control channel resource selection for scheduling request transmission in accordance with one or more aspects of the present disclosure.

In some wireless communications systems, a user equipment (UE) may transmit a scheduling request to request uplink resources for a subsequent transmission by the UE. The scheduling request may be transmitted via a physical uplink control channel (PUCCH) according to a scheduling request configuration. For example, a network entity may transmit control signaling (e.g., a radio resource control (RRC) configuration), which may be referred to as a scheduling request configuration, that may allocate one or more PUCCH resources for transmission of the scheduling request. In some aspects, the PUCCH resources may be referred to as scheduling request resources. The scheduling request configuration and each of the scheduling request resources indicated by the scheduling request configuration may be associated with or identified by a same scheduling request identifier (ID). The scheduling request resources indicated by the scheduling request configuration may be allocated across one or more cells, such as a secondary cell (SCell), a primary cell (PCell), a primary cell of a master or secondary cell group (SpCell), or any combination thereof.

If a UE is configured with scheduling request resources on different cells that correspond to a same scheduling request ID, selection of which scheduling request resource to use to signal a scheduling request may be up to UE implementation. In some cases, for example, the UE may select a scheduling request resource on the SCell, and the UE may refrain from transmitting scheduling request on the SpCell for a duration, which may reduce reliability and increase power consumption. Additionally, or alternatively, the scheduling request resource selection may be random or otherwise ambiguous.

As described herein, a UE that is configured with scheduling request resources on two or more different cells may select a scheduling request resource for transmission of a scheduling request based on one or more conditions or parameters to reduce ambiguity. The techniques for scheduling request resource selection described herein may provide for improved communication reliability and throughput, as well as reduced latency and reduced power consumption by the UE. For example, the UE may select a scheduling request resource based on a power mode of the UE, a signal metric level (e.g., a reference signal received power (RSRP) level, or some other signal metric) of a corresponding cell, a numerology of the corresponding cell (e.g., a slot length in the time domain, a symbol length in the time domain, or a subcarrier spacing (SCS) value), or any combination thereof. The UE may select the scheduling request resource from two or more scheduling request resources that are configured for scheduling request transmission on different cells and are associated with a same scheduling request ID. The two or more scheduling request resources may be overlapping or non-overlapping in time. The UE may transmit the scheduling request to a network entity via the selected scheduling request resource. In response to the scheduling request, the network entity may grant or schedule uplink shared channel resources for the UE to use for the transmission.

In some aspects, the UE may operate in a reduced power mode. The UE may be configured to select a scheduling request resource based on a type of cell when operating in the reduced power mode. If the UE operates in the reduced power mode, the UE may select a scheduling request resource on an SpCell, for example, to improve reliability of transmissions during the reduced power mode. In some other aspects, the UE may measure a signal metric (e.g., RSRP) associated with each cell. The UE may select a scheduling request resource on the cell that is associated with a greatest measured signal metric to improve reliability and reduce power consumption. In some other aspects, the UE may select a scheduling request resource on the cell that is associated with a greatest numerology (e.g., a shortest slot length, a shortest symbol length, or greatest SCS). The UE may transmit the scheduling request via the selected scheduling request resource on the cell associated with the greatest numerology faster than if the UE transmits the scheduling request on the other cells associated with lower numerologies. The UE may thus select a scheduling request resource from a set of configured scheduling request resources associated with a same scheduling request ID based on one or more rules or parameters configured to improve reliability and throughput of the scheduling request transmission while reducing latency and power consumption by the UE.

Aspects of the disclosure are initially described in the context of wireless communications systems. Additional aspects are described in the with reference to communication timelines and process flows. Aspects of the disclosure are further illustrated by and described with reference to apparatus diagrams, system diagrams, and flowcharts that relate to uplink control channel resource selection for scheduling request transmission.

FIG. 1 illustrates an example of a wireless communications system 100 that supports uplink control channel resource selection for scheduling request transmission in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support uplink control channel resource selection for scheduling request transmission as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples of the wireless communications system 100, a UE 115 may receive control signaling that may indicate or configure one or more scheduling request resources. The scheduling request resources may be allocated across a first cell, a second cell, one or more other cells, or any combination thereof (e.g., a PCell, an SCell, an SpCell, or some other cell). The UE 115 may generate a scheduling request based on the control signaling to request resources for a subsequent uplink transmission by the UE 115. The generated scheduling request may be applicable to each of the scheduling request resources indicated by the control signaling. For example, the control signaling may correspond to a scheduling request resource configuration that may be associated with a single scheduling request ID, such that each of the indicated scheduling request resources may be associated with the same scheduling request ID as the generated scheduling request.

The UE 115 may select a scheduling request resource (e.g., a PUCCH resource) for transmission of the scheduling request on one of the cells based on one or more parameters or conditions associated with the UE 115, the cells, or both. For example, the scheduling request resource selection may be based on a power mode of the UE 115 (e.g., a low power mode), a relative signal metric (e.g., RSRP) associated with the cells, a relative numerology of the cells, or a combination thereof. The UE 115 may transmit the scheduling request via the selected scheduling request resource on the corresponding cell. The selection of the scheduling request resource based on the one or more conditions or parameters may provide for reduced ambiguity, which may reduce latency of communications and improve reliability and throughput of the scheduling request transmission.

Figure 2:
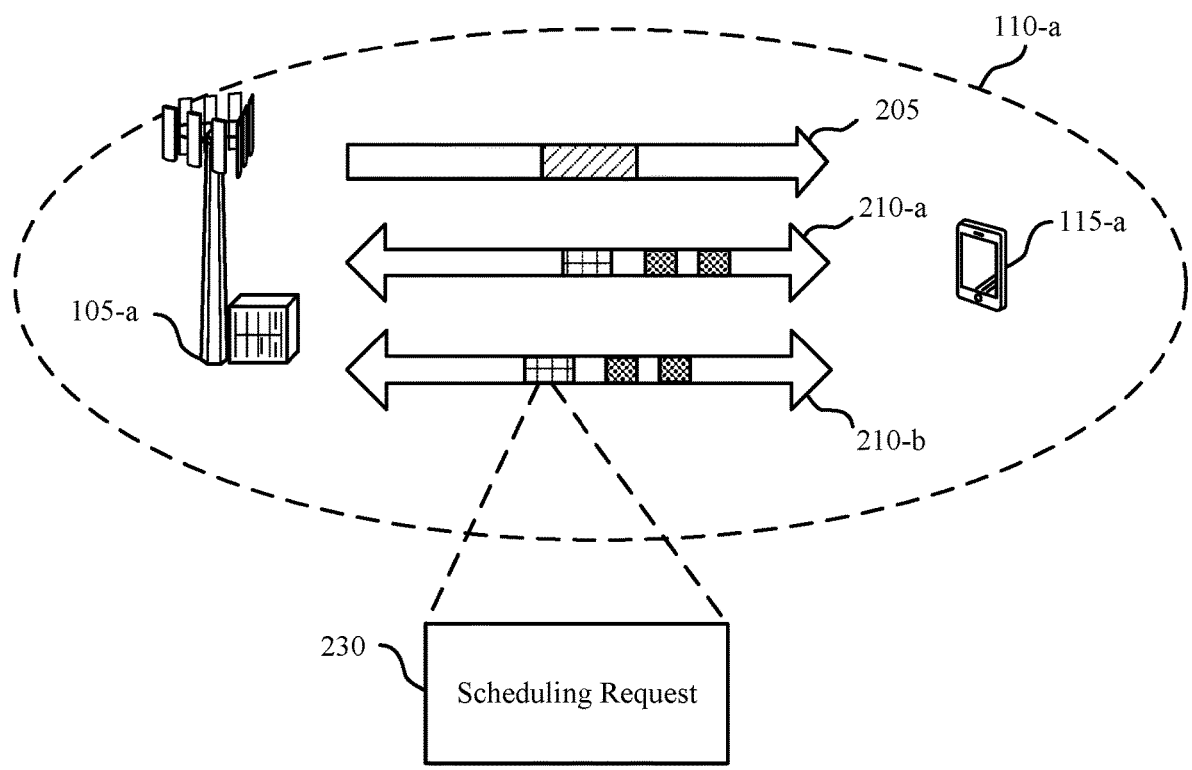
FIG. 2 illustrates an example of a wireless communications system that supports uplink control channel resource selection for scheduling request transmission in accordance with one or more aspects of the present disclosure.
Figure 2:
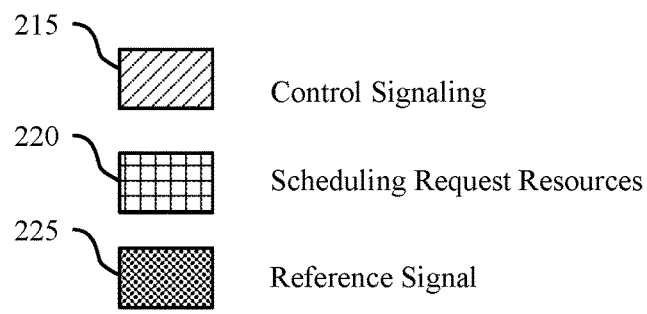

FIG. 2 illustrates an example of a wireless communications system 200 that supports uplink control channel resource selection for scheduling request transmission in accordance with one or more aspects of the present disclosure. The wireless communications system 200 may implement or be implemented by aspects of the wireless communications system 100 as described with reference to FIG. 1. For example, the wireless communications system 200 may include a network entity 105-a and UE 115-a which may represent examples of a network entity 105 and a UE 115 as described with reference to FIG. 1. The network entity 105-a may communicate with the UE 115-a within a geographic coverage area 110-a and via one or more cells 210 (e.g., cells 210-a and 210-b). In some aspects, the network entity 105-a may transmit downlink data or control information to the UE 115-a via a downlink communication link 205, which may be included in or separate from one or more of the cells 210.

The UE 115-a and the network entity 105-a may exchange signaling on one or both of the cell 210-a and the cell 210-b. The cell 210-a and the cell 210-b may be examples of different serving cells or different component carriers supported for communication between the UE 115-a and the network entity 105-a. A cell 210 may refer to a logical communication entity used for communication with the network entity 105-a (e.g., over a carrier). Each cell 210 may be associated with a respective cell ID for distinguishing from other neighbor cells. The cell 210-a and the cell 210-b may be associated with the same network entity 105-a or with different network entities 105. For example, the network entity 105-a may provide communication coverage via the cell 210-a, the cell 210-b, one or more other cells 210, or any combination thereof. In some aspects, a different component of the network entity 105-a (e.g., a different RU, CU, radio head, or transmission/reception point (TRP)) may be associated with each cell 210. In some other aspects, the 210-a and the cell 210-b may be associated with different network entities 105 (not illustrated in FIG. 2).

The cell 210-a and the cell 210-b may be co-located (e.g., may be located at a same physical location) or may be distributed (e.g., may be located at different physical locations). For example, as illustrated in FIG. 2, the cell 210-a and the cell 210-b may be associated with the same coverage area 110-a. In some other aspects, the cell 210-a may be associated with the coverage area 110-a and the UE 115-a may communicate via a second cell 210 that may be associated with a different coverage area 110 or portion of a coverage area 110 that is at least partially overlapping with the coverage area 110-a. Each of the cells 210-a and 210-b may be an example of or may otherwise function as a PCell, an SCell, a P(S)Cell (e.g., one or both of a PCell and a PSCell), an SpCell, or some other type of cell. The SpCell may correspond to a primary cell of a cell group, such as a master cell group or a secondary cell group. In some aspects, the SpCell may be associated with higher reliability than a secondary cell in the cell group.

After establishing a connection with the UE 115-a via one or more cells 210, the network entity 105-a may transmit control signaling 215 to the UE 115-a. The control signaling 215 may represent an example of an RRC configuration, a medium access control-control element (MAC-CE), downlink control information (DCI), or some other control signaling 215. The control signaling 215 may be transmitted via the downlink communication link 205, which may be associated with the cell 210-a, the cell 210-b, another cell 210, or any combination thereof. The control signaling 215 may include a scheduling request configuration (e.g., an information element (IE) in the control signaling 215) that may allocate PUCCH resources via which the UE 115-a may transmit a scheduling request 230. The PUCCH resources allocated for the scheduling request 230 may be referred to as scheduling request resources 220 herein.

The scheduling request configuration may additionally or alternatively configure one or more parameters for the cell 210-a and/or the cell 210-b, may indicate one or more timers for scheduling request transmission (e.g., prohibit timers), or both. The scheduling request configuration and each of the scheduling request resources 220 indicated by the scheduling request configuration may be associated with a same scheduling request ID.

The UE 115-a may select a scheduling request resource 220 from the set of scheduling request resources 220 allocated by the scheduling request configuration to use for transmitting a scheduling request 230. The UE 115-a may select a scheduling request resource 220 when the UE 115-a is triggered to generate an uplink transmission (e.g., the UE 115-a has data to transmit). The scheduling request 230 transmitted by the UE 115-a via the selected scheduling request resource 220 may request uplink resources (e.g., physical uplink shared channel (PUSCH) resources) for the subsequent uplink transmission by the UE 115-a. The network entity 105-a may receive the scheduling request 230 and select resources to allocate to the UE 115-a. The network entity 105-a may transmit second control signaling 215 to the UE 115 a to indicate the allocated PUSCH resources.

The scheduling request 230 generated by the UE 115-a may be associated with a same scheduling request ID as the scheduling request ID of the scheduling request configuration. That is, the UE 115-a may select a scheduling request resource 220 from a set of scheduling request resources 220 having a same scheduling request ID as the generated scheduling request 230. In some cases, however, the scheduling request configuration may allocate scheduling request resources 220 having a same scheduling request ID on multiple cells 210. In the example of FIG. 2, the scheduling request configuration may allocate scheduling request resources 220 on both of the cells 210-a and 210-b. In such cases, techniques for selecting which scheduling request resource 220 and which corresponding cell 210 to use for the scheduling request transmission via may be ambiguous.

In some cases, for example, the UE 115-a may select a scheduling request resource 220 randomly, or the UE 115-a may select a scheduling request resource 220 that occurs earlier in time, which may result in the UE 115-a repeatedly transmitting on one of the cells 210. For example, the scheduling request resources 220 may be allocated earlier in time on the cell 210-b (e.g., an SCell) than on the cell 210-a (e.g., a SpCell), such that the UE 115-a may select the scheduling request resources 220 on the cell 210-b for each scheduling request 230, which may be associated with lower reliability, lower throughput, and increased latency as compared to alternating which cells 210 are used for transmission or transmitting on the cell 210-a.

To reduce ambiguity and improve communication reliability, the UE 115-a as described herein may select a scheduling request resource 220 based on various conditions or parameters, such as a power mode of the UE 115-a, a signal metric associated with the cells 210, a numerology of the cells 210, or any combination thereof. The UE 115-a may subsequently transmit the generated scheduling request 230 via the selected scheduling request resource 220 on the corresponding cell 210. The conditions and parameters for scheduling request resource selection described herein may provide rules for selecting a scheduling request resource 220 on a cell 210 that may provide for improved throughput and reliability for a given wireless communication, as well as reduced latency for uplink transmissions.

In some aspects, the UE 115-*a* may operate in a reduced power mode. The UE 115-*a* may be configured to select a scheduling request resource 220 based on a type of cell when operating in this reduced power mode. For example, if the scheduling request configuration allocates scheduling request resource(s) 220 on both the cell 210-*a* and the cell 210-*b* and the UE 115-*a* operates in the reduced power mode, the UE 115-*a* may select the scheduling request resource 220 allocated on the cell 210-*a* based on the type of the cell and a rule pertaining to cell selection for scheduling request transmission during a reduced power mode. The rule for which type of cell 210 to select when operating in the reduced power mode may be configured (e.g., predefined in a standard or configured during manufacture of the UE 115-*a*) or indicated to the UE 115-*a* via control signaling 215 (e.g., an RRC configuration, DCI, or a MAC-CE).

The rule may, in some aspects, instruct the UE 115-*a* to select a cell 210 that is associated with scheduled transmissions having higher transmission power than other cells 210 to improve throughput and reliability of transmissions while the UE 115-*a* operates in the reduced power mode. For example, if the cell 210-*a* is an SpCell and the cell 210-*b* is an SCell and the UE 115-*a* operates in the reduced power mode, the UE 115-*a* may select a scheduling request resource 220 on the SpCell based on the rule and the SpCell transmissions being scheduled with higher power than the SCell (e.g., PUCCH SCell) transmissions. Additionally, or alternatively, the rule may indicate a certain type of cell 210 for the reduced power mode.

In some other aspects, the UE 115-*a* may measure a signal metric associated with each cell 210, and the UE 115-*a* may select a scheduling request resource 220 based on the measured signal metrics. For example, the UE 115-*a* may select a scheduling request resource 220 on a cell 210 that is associated with a greatest measured signal metric to improve reliability and reduce power consumption. The signal metric may be a reference signal received power (RSRP), a signal-to-noise ratio (SNR), a signal-to-interference-plus-noise ratio (SINR), or some other signal metric. The UE 115-*a* may receive one or more reference signals 225 via each cell 210 and measure the signal metric associated with each of the cells 210-*a* and 210-*b* based on the reference signals 225. In some aspects, the UE 115-*a* may measure a greater RSRP of the reference signals 225 received via the cell 210-*b* than the measured RSRP of the reference signals 225 received via the cell 210-*a*, and the UE 115-*a* may select a scheduling request resource 220 on the cell 210-*b* for a scheduling request 230 accordingly.

The signal metric levels may remain the same for each cell 210 over time or may change dynamically. In some aspects, the UE 115-*a* may subsequently measure a greater RSRP level of the cell 210-*a* than the cell 210-*b*, and the UE 115-*a* may select a scheduling request resource 220 on the cell 210-*a* accordingly for a subsequent scheduling request 230. By selecting the scheduling request resource 220 on whichever cell 210 has a greatest signal metric, the UE 115-*a* may increase a reliability of the transmission of the scheduling request 230 and may reduce power consumption by the UE 115-*a*. For example, the UE 115-*a* may transmit the scheduling request 230 according to a transmission power that is based on a value of the signal metric. If the cell 210-*a* has a lower signal metric measurement than the cell 210-*b*, the UE 115-*a* may transmit the scheduling request 230 according to a lower transmission power on the cell 210-*a* than the cell 210-*b*, which may reduce power consumption and complexity.

In some other aspects, the UE 115-*a* may select a scheduling request resource 220 based on a numerology (e.g., a symbol length, a slot length, or an SCS) of each cell 210. For example, the UE 115-*a* may select a scheduling request resource 220 on a cell 210 that is associated with a greater numerology than the numerologies of the other cells 210 on which the scheduling request resources 220 are allocated. In the example of FIG. 2, if scheduling request resources 220 associated with a same scheduling request ID are allocated on the cell 210-*a* and the cell 210-*b*, and the cell 210-*a* has a greater numerology than the cell 210-*b*, the UE 115-*a* may select the scheduling request resource 220 on the cell 210-*a* for transmission of the scheduling request 230. The cells 210 may be any type of cells 210 described herein or any additional types of cells 210. In some aspects, transmissions via a cell 210 having a greater numerology may be associated with reduced latency (e.g., faster) as compared with transmissions on other cells 210. As such, selecting the scheduling request resources 220 based on a numerology of a cell 210 as described herein may reduce latency.

If a numerology of one cell 210 is the same as the numerology of another cell 210, the UE 115-*a* may be configured to select the scheduling request resource 220 based on a type of the cells 210 (e.g., based on a rule pertaining to cell selection for scheduling request). For example, the rule may indicate that the UE 115-*a* is to select a scheduling request resource 220 on an SpCell, or some other type of cell 210. In some aspects, a certain type of cell 210, such as the SpCell, may be utilized as a default when a numerology of two or more cells 210 is unavailable, inconclusive, or if they numerologies are equal. Transmission on the default cell 210 may, in some aspects, be associated with higher power than other cells 210, such that transmissions on the default cell 210 may have improved reliability and throughput.

The UE 115-*a* may thus select a scheduling request resource 220 from a set of multiple scheduling request resources 220 associated with a same scheduling request ID and allocated across multiple cells 210 based on one or more conditions, parameters, and rules as described herein. The described scheduling request resource selection techniques may reduce ambiguity, and improve performance of the scheduling request transmission by the UE 115-*a*. For example, the described techniques may provide for the UE 115-*a* to select a scheduling request resource 220 that is associated with improved reliability, improved throughput, reduced power consumption, or reduced latency as compared with other selection techniques. The described conditions, parameters, and rules may be applied by the UE 115-*a* when the set of allocated scheduling request resources 220 are at least partially overlapping in time, or are non-overlapping in time, as described in further detail elsewhere herein, including with reference to FIGS. 3 and 4.

Figure 3:
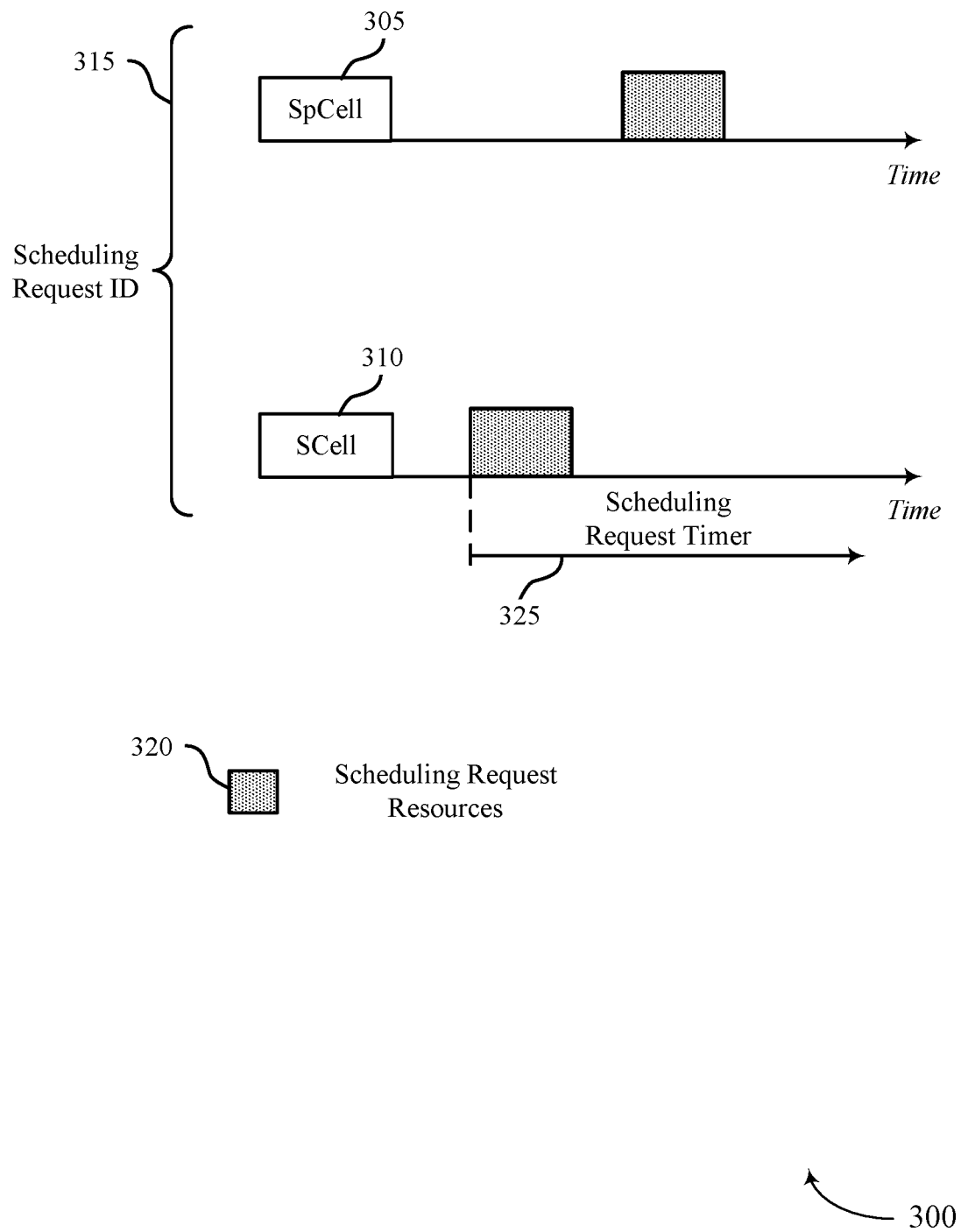
FIG. 3 illustrates an example of a communication timeline that supports uplink control channel resource selection for scheduling request transmission in accordance with one or more aspects of the present disclosure.

FIG. 3 illustrates an example of a communication timeline 300 that supports uplink control channel resource selection for scheduling request transmission in accordance with one or more aspects of the present disclosure. In some examples, the communication timeline 300 may implement aspects of wireless communications systems 100 and 200 as described with reference to FIGS. 1 and 2. For example, the communication timeline 300 illustrates scheduling request resources 320 (e.g., PUCCH resources) that are allocated on an SpCell 305 and an SCell 310, which may represent examples of corresponding elements described with reference to FIG. 2. In this example, the scheduling request resources 320 on the SpCell 305 may not overlap in time with the scheduling request resources 320 on the SCell 310.

The scheduling request resources 320 may be allocated by a network entity 105 for a UE 115, which may represent examples of corresponding devices as described with reference to FIGS. 1 and 2. For example, the network entity 105 may transmit control signaling including a scheduling request configuration that allocates the scheduling request resources 320 on the SpCell 305 and the SCell 310 to the UE 115, as described with reference to FIG. 2. The scheduling request configuration may indicate a scheduling request ID 315 (e.g., SR id_0, or some other ID) associated with each of the scheduling request resources 320 that are allocated by the configuration. The scheduling request resources 320 may include time and frequency resources allocated within a bandwidth of each cell.

The UE 115, the network entity 105, or both may, in some aspects, be configured with various timers for scheduling request communications. One example of such a timer may include a scheduling request timer 325 (e.g., a scheduling request prohibit timer) that may be configured when latency tolerant data is available for transmission by the UE 115. The scheduling request timer 325 may be configured for a logical channel, various layers of a network, for one or more cells, or any combination thereof. The scheduling request timer 325 may assist with prioritization of high priority traffic. For example, the network entity 105 may refrain from scheduling uplink resources, and the UE 115 may refrain from transmitting a scheduling request before the scheduling request timer 325 expires to provide for transmission of high priority traffic (e.g., time sensitive information).

In the example of FIG. 3, if the UE 115 selects scheduling request resource 320 randomly or based on an earliest available resource, the UE 115 may select the scheduling request resource 320 on the SCell 310. The UE 115 may transmit a scheduling request via the scheduling request resource 320 on the SCell 310, which may initiate the scheduling request timer 325. The UE 115 may not transmit a scheduling request before expiration of the scheduling request timer 325. As such, the UE 115 may not transmit a scheduling request via the scheduling request resource 320 on the SpCell 305. In some aspects, the scheduling request resources 320 may be configured periodically, such that a similar allocation of resources may be present on the SpCell 305 and the SCell 310 over one or more time periods (e.g., every 100 ms, or some other time period). In such cases, the UE 115 may continue to transmit the scheduling request via the SCell 310, and the UE 115 may refrain from transmitting via the SpCell 305, which may reduce reliability and throughput of the communications.

To reduce ambiguity and improve communication reliability, the UE 115 may select a scheduling request resource 320 from the set of scheduling request resources 320 that are associated with the same scheduling request ID 315 based on one or more conditions, rules, and parameters. In the example of FIG. 3, the scheduling request configuration may allocate scheduling request resource 320 on the SpCell 305 and the SCell 310, and the scheduling request resource 320 on the SCell 310 may occur first in time. However, the UE 115 may select either one of the scheduling request resources 320 based on the rules and parameters described herein.

For example, if the UE 115 operates in a reduced power mode, the UE 115 may select a scheduling request resource 320 based on a type of cell on which the scheduling request resource 320 is allocated. In some aspects, the UE 115 may receive signaling or a configuration that indicates the type of cell (e.g., a rule pertaining to cell selection for scheduling request transmission). In the example of FIG. 3, if the type of the cell indicated by the rule pertaining to cell selection for scheduling request is an SpCell 305, the UE 115 may select the scheduling request resource 320 on the SpCell in FIG. 3. The UE 115 may transmit a scheduling request via the scheduling request resource 320 on the SpCell 305, and the UE 115 may refrain from transmitting via the scheduling request resource 320 on the SCell 310 (e.g., the UE 115 may skip this resource). In such cases, the scheduling request timer 325 may be initiated by the transmission of the scheduling request via the scheduling request resource 320 on the SpCell 305.

In some other aspects, the UE 115 may measure a signal metric (e.g., RSRP, SNR, SINR, or some other signal metric) based on one or more reference signals received via each of the SpCell 305 and the SCell 310. The UE 115 may select the scheduling request resource 320 on whichever cell is associated with a greater signal metric level. For example, if the cell conditions of the SpCell 305 are greater than the cell conditions of the SCell 310 based on the measured signal metric levels, the UE 115 will transmit a scheduling request via the scheduling request resource 320 on the SpCell 305 and the UE 115 will refrain from transmitting the scheduling request on the SCell 310.

In some other aspects, the UE 115 may select a scheduling request resource 320 based on a numerology of the corresponding cell. In the example of FIG. 3, the SpCell 305 numerology may be greater than the numerology of the SCell 310. The UE 115 may transmit the scheduling request via the scheduling request resource 320 on the SpCell 305 based on the numerology being greater, and the UE 115 may refrain from transmitting the scheduling request via the scheduling request resource 320 on the SCell 310. If the numerologies of the cells are the same or inconclusive, the UE 115 may be configured with a type of cell (e.g., a default cell) to use for selection. For example, the default cell may be the SpCell 305, and the UE 115 may select the scheduling request resource 320 on the SpCell 305 accordingly.

Although the SpCell 305 and the SCell 310 are illustrated in FIG. 3, it is to be understood that the described techniques for selection of a scheduling request resource 320 may be applied for scheduling request resources 320 that are allocated across any type of cells and any quantity of cells, including the cell types illustrated here and any other cell types. In some aspects, the UE 115 may use a combination of the described techniques for scheduling request resource selection. For example, the UE 115 may select a scheduling request resource 320 based on both a power mode of the UE 115 and a signal metric of the cells, or some other combination.

Additionally, or alternatively, the cell conditions, the selection techniques, or both may change dynamically over time. For example, the UE 115 may select a scheduling request resource 320 based on a power mode of the UE 115 in a first time period and the UE 115 may select a scheduling request resource 320 based on a numerology of the cells in a second time period. In such cases, the scheduling request configuration and corresponding scheduling request ID 315 may be the same or different for the scheduling request resources 320 allocated in each time period (e.g., a periodic allocation). The UE 115 may receive control signaling that indicates which conditions to use for selection of a scheduling request resource 320 at a given time.

The UE 115 may thus select a scheduling request resource 320 from a set of non-overlapping scheduling request resources 320 associated with a same scheduling request ID 315 and allocated across different cells based on one or more conditions or parameters. The described techniques for selection of a scheduling request resource 320 may improve communication reliability, improve throughput, reduce ambiguity, reduce latency, and reduce power consumption, among other advantages.

Figure 4:
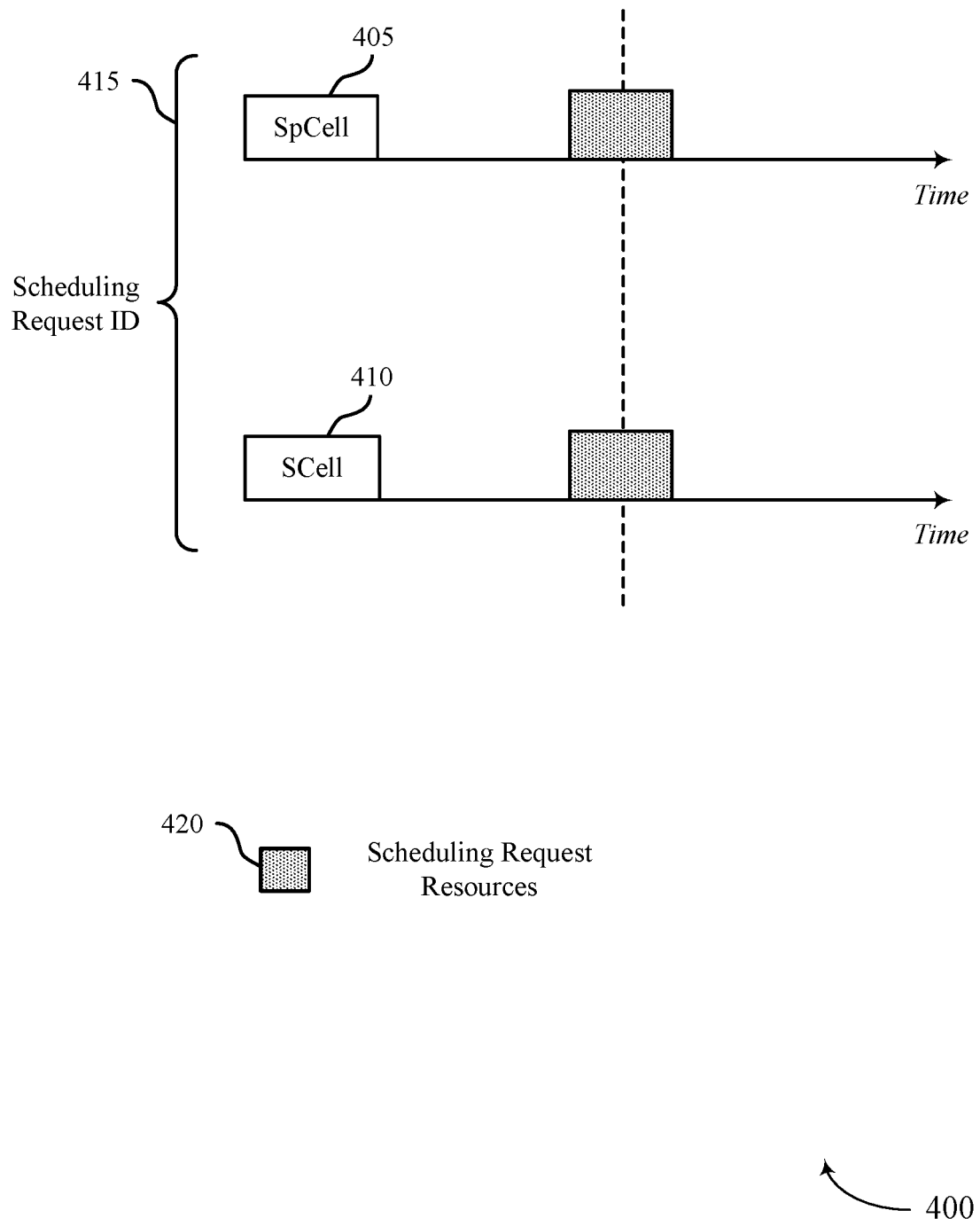
FIG. 4 illustrates an example of a communication timeline that supports uplink control channel resource selection for scheduling request transmission in accordance with one or more aspects of the present disclosure.

FIG. 4 illustrates an example of a communication timeline 400 that supports uplink control channel resource selection for scheduling request transmission in accordance with one or more aspects of the present disclosure. In some examples, the communication timeline 400 may implement aspects of wireless communications systems 100 and 200 as described with reference to FIGS. 1 and 2. For example, the communication timeline 400 illustrates scheduling request resources 420 (e.g., PUCCH resources) that are allocated on an SpCell 405 and an SCell 410, which may represent examples of corresponding elements described with reference to FIGS. 2 and 3. In this example, the scheduling request resources 420 on the SpCell 405 may at least partially overlap in time with the scheduling request resources 420 on the SCell 410.

The scheduling request resources 420 may be allocated by a network entity 105 for a UE 115, which may represent examples of corresponding devices as described with reference to FIGS. 1-3. For example, the network entity 105 may transmit control signaling including a scheduling request configuration that allocates the scheduling request resources 420 on the SpCell 405 and the SCell 410 to the UE 115, as described with reference to FIG. 2. The scheduling request configuration may indicate a scheduling request ID 415 (e.g., SR id_0, or some other ID) associated with each of the scheduling request resources 420 that are allocated by the configuration. The scheduling request resources 420 may include time and frequency resources allocated within a bandwidth of each cell.

The UE 115 may not support transmission of a scheduling request via scheduling request resources 420 on different cells that overlap in time. That is, the UE 115 may not transmit two or more scheduling requests at the same time. In some aspects, the UE 115, the network entity 105, or both may be configured with a scheduling request timer, such as the scheduling request timer 325 illustrated in FIG. 3, which may prohibit transmission of the scheduling request at the same time. In the example of FIG. 4, the UE 115 may thus select a single scheduling request resource 420 from the set of scheduling request resources 420 associated with the scheduling request ID 415 to use for transmitting a scheduling request. However, in some cases, the selection of the scheduling request resource 420 may be ambiguous or random, which may reduce reliability and throughput of communications.

To reduce ambiguity and improve communication reliability as described herein, the UE 115 may select a scheduling request resource 420 from the set of scheduling request resources 420 that are associated with the same scheduling request ID 415 based on one or more conditions, rules, and parameters. In the example of FIG. 4, the scheduling request configuration may allocate scheduling request resource 420 on the SpCell 405 and the SCell 410 that may occur at the same time. The UE 115 may select either one of the scheduling request resources 420 based on the rules and parameters described herein.

For example, if the UE 115 operates in a reduced power mode, the UE 115 may select a scheduling request resource 420 based on a type of cell on which the scheduling request resource 420 is allocated. In some aspects, the UE 115 may receive signaling or a configuration that indicates the type of cell (e.g., a rule pertaining to cell selection for scheduling request transmission). In the example of FIG. 4, if the type of the cell indicated by the rule pertaining to cell selection for scheduling request is an SpCell 405, the UE 115 may select the scheduling request resource 420 on the SpCell in FIG. 4. The UE 115 may transmit a scheduling request via the scheduling request resource 420 on the SpCell 405, and the UE 115 may refrain from transmitting via the scheduling request resource 420 on the SCell 410 (e.g., the UE 115 may skip this resource).

In some other aspects, the UE 115 may measure a signal metric (e.g., RSRP, SNR, SINR, or some other signal metric) based on one or more reference signals received via each of the SpCell 405 and the SCell 410. The UE 115 may select the scheduling request resource 420 on whichever cell is associated with a greater signal metric level. For example, if the cell conditions of the SpCell 405 are greater than the cell conditions of the SCell 410 based on the measured signal metric levels, the UE 115 may transmit a scheduling request via the scheduling request resource 420 on the SpCell 405 and the UE 115 may refrain from transmitting the scheduling request on the SCell 410.

In some other aspects, the UE 115 may select a scheduling request resource 420 based on a numerology of the corresponding cell. In the example of FIG. 4, the SpCell 405 numerology may be greater than the numerology of the SCell 410. The UE 115 may transmit the scheduling request via the scheduling request resource 420 on the SpCell 405 based on the numerology being greater, and the UE 115 may refrain from transmitting the scheduling request via the scheduling request resource 420 on the SCell 410. If the numerologies of the cells are the same or inconclusive, the UE 115 may be configured with a type of cell (e.g., a default cell) to use for selection. For example, the default cell may be the SpCell 405, and the UE 115 may select the scheduling request resource 420 on the SpCell 405 accordingly.

Although the SpCell 405 and the SCell 410 are illustrated in FIG. 4, it is to be understood that the described techniques for selection of a scheduling request resource 420 may be applied for scheduling request resources 420 that are allocated across any type of cells and any quantity of cells, including the cell types illustrated here and any other cell types. In some aspects, the UE 115 may use a combination of the described techniques for scheduling request resource selection. For example, the UE 115 may select a scheduling request resource 420 based on both a power mode of the UE 115 and a signal metric of the cells, or some other combination.

Additionally, or alternatively, the cell conditions, the selection techniques, or both may change dynamically over time. For example, the UE 115 may select a scheduling request resource 420 based on a power mode of the UE 115 in a first time period and the UE 115 may select a scheduling request resource 420 based on a numerology of the cells in a second time period. In such cases, the scheduling request configuration and corresponding scheduling request ID 415 may be the same or different for the scheduling request resources 420 allocated in each time period (e.g., a periodic allocation). The UE 115 may receive control signaling that indicates which conditions to use for selection of a scheduling request resource 420 at a given time.

The UE 115 may thus select a scheduling request resource 420 from a set of scheduling request resources 420 that at least partially overlap in time, are associated with a same scheduling request ID 415, and are allocated across different cells based on one or more conditions or parameters. The described techniques for selection of a scheduling request resource 420 may improve communication reliability, improve throughput, reduce ambiguity, reduce latency, and reduce power consumption, among other advantages.

Figure 5:
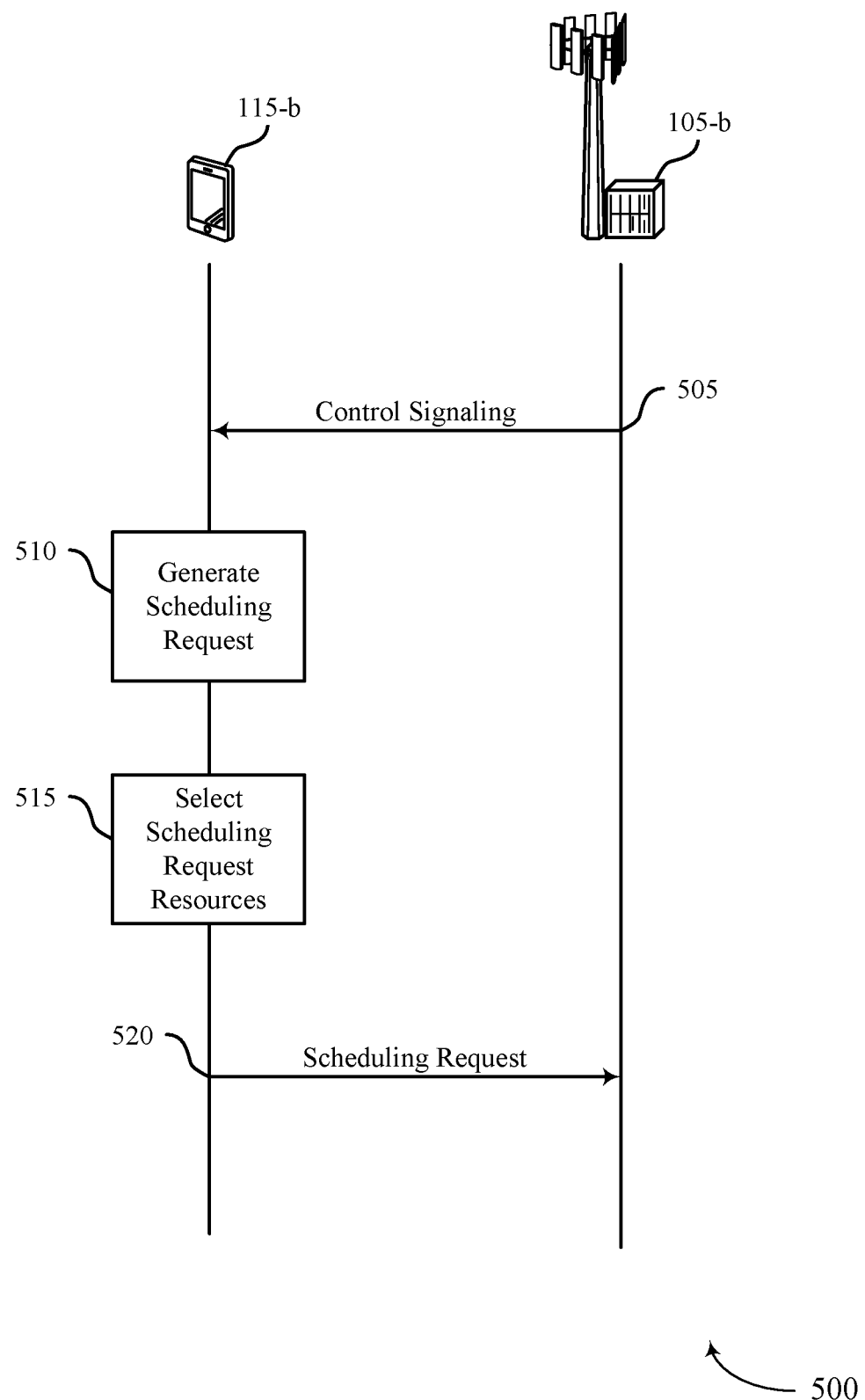
FIG. 5 illustrates an example of a process flow that supports uplink control channel resource selection for scheduling request transmission in accordance with one or more aspects of the present disclosure.

FIG. 5 illustrates an example of a process flow 500 that supports uplink control channel resource selection for scheduling request transmission in accordance with one or more aspects of the present disclosure. The process flow 500 may implement or be implemented by aspects of the wireless communications systems 100 and 200 or the communication timelines 300 or 400 as described with reference to FIGS. 1-4. For example, the process flow 500 illustrates techniques for selecting an scheduling request resource for transmission of a scheduling request between a UE 115-b and a network entity 105-b, which may represent aspects of corresponding devices as described with reference to FIGS. 1-4. In some aspects, the UE 115-b may select a scheduling request resource based on various conditions or parameters, as described with reference to FIGS. 2-4.

In the following description of the process flow 500, the operations between the UE 115-b and the network entity 105-b may be performed in different orders or at different times. Some operations may also be left out of the process flow 500, or other operations may be added. Although the UE 115-b and the network entity 105-b are shown performing the operations of the process flow 500, some aspects of some operations may also be performed by one or more other wireless devices.

At 505, the network entity 105-b may transmit control signaling to the UE 115-b. The control signaling may indicate a first scheduling request resource on a first cell (e.g., an SpCell, or some other type of cell) and a second scheduling request resource on a second cell (e.g., an SCell, or some other type of cell). The control signaling may additionally or alternatively indicate a scheduling request ID for the first and second scheduling request resources, as described with reference to FIGS. 3 and 4.

At 510, the UE 115-b may generate a scheduling request. Both of the first scheduling request resource on the first cell and the second scheduling request resource on the second cell may be appliable to the scheduling request. For example, the UE 115-b may generate the scheduling request based on the scheduling request ID indicated via the control signaling, such that the same scheduling request ID may be applicable to the scheduling request and the first and second scheduling request resources.

At 515, the UE 115-b may select one of the scheduling request resources for transmission of the scheduling request. The UE 115-b may select the scheduling request resource based on one or more of a power mode of the UE 115-b, a signal metric associated with the cells, or a numerology of the cells. In some aspects, the UE 115-b may operate in a reduced power mode. In this case, the scheduling request resource selection may be based on the UE 115-b operating in the reduced power mode and a type of the cell associated with the selected scheduling request resource (e.g., an SpCell).

In some other aspects, the UE 115-b may receive one or more reference signals from the network entity 105-b via the first and second cells. The UE 115-b may measure a signal metric associated with the first cell and the second cell based on the one or more reference signals, and the UE 115-b may select the scheduling request resource based on the measured signal metric levels. In some other aspects, the UE 115-b may select the first scheduling request resource based on a numerology of the first cell being greater than a numerology of the second cell.

The selection of the scheduling request resource may be based on both of the first cell and the second cell being associated with the same scheduling request ID as the scheduling request. The first and second scheduling request resources may be non-overlapping in time or at least partially overlapping in time, as described with reference to FIGS. 3 and 4.

At 520, the UE 115-b may transmit the scheduling request to the network entity 105-b via the selected scheduling request resource on the corresponding cell. The scheduling request may be transmitted according to a first transmission power that may be based on a value of a signal metric of the cell. For example, if the signal metric is relatively high, the scheduling request may be transmitted with a relatively low transmission power.

Figure 6:
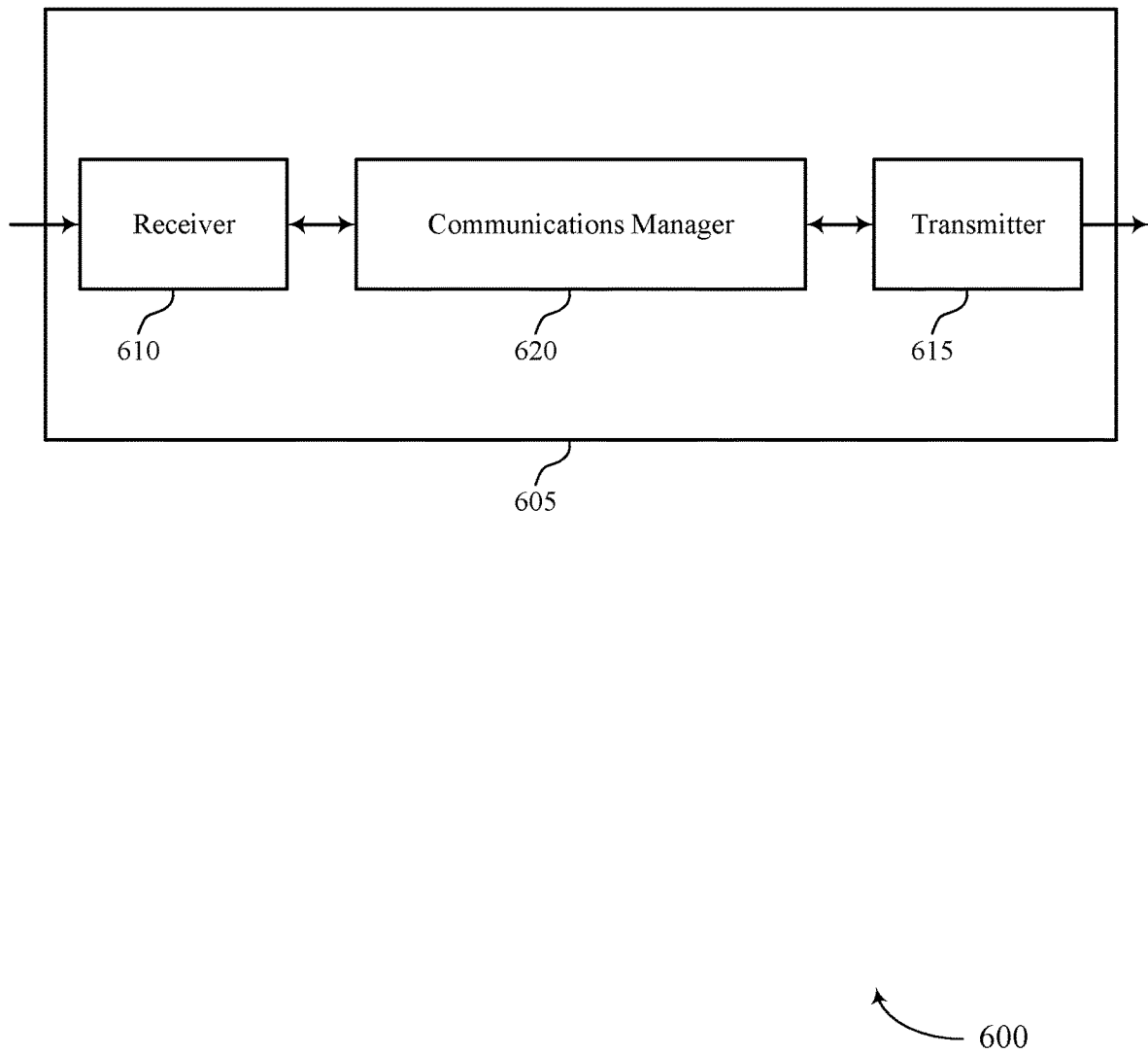
FIGS. 6 and 7 show block diagrams of devices that support uplink control channel resource selection for scheduling request transmission in accordance with one or more aspects of the present disclosure.

FIG. 6 shows a block diagram 600 of a device 605 that supports uplink control channel resource selection for scheduling request transmission in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink control channel resource selection for scheduling request transmission). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink control channel resource selection for scheduling request transmission). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of uplink control channel resource selection for scheduling request transmission as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving control signaling that indicates a first scheduling request resource on a first cell and a second scheduling request resource on a second cell. The communications manager 620 may be configured as or otherwise support a means for generating a scheduling request at the UE, where both the first scheduling request resource on the first cell and the second scheduling request resource on the second cell are applicable to the scheduling request. The communications manager 620 may be configured as or otherwise support a means for selecting the first scheduling request resource for transmission of the scheduling request on the first cell based on one or more of: a power mode of the UE, a signal metric associated with the first cell, or a numerology of the first cell. The communications manager 620 may be configured as or otherwise support a means for transmitting the scheduling request via the first scheduling request resource on the first cell based on the selecting.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources, among other advantages. For example, by selecting a scheduling request resource based on one or more of a power mode of the device 605 (e.g., a UE), a signal metric level of a corresponding cell, a numerology of the corresponding cell, the device 605 may select a reliable resource. For example, the selected resource may be on a cell that is associated with improved transmission power, which may improve reliability of the transmission, or the selected resource may be on a cell that is associated with a greater numerology and may reduce latency of the transmission, or both. The processor of the device 605 may thus reduce processing associated with retransmissions that may occur if the resource is selected randomly, reduce power consumption, improve communication reliability, and improve throughput by selecting a scheduling request resource according to the described techniques.

Figure 7:
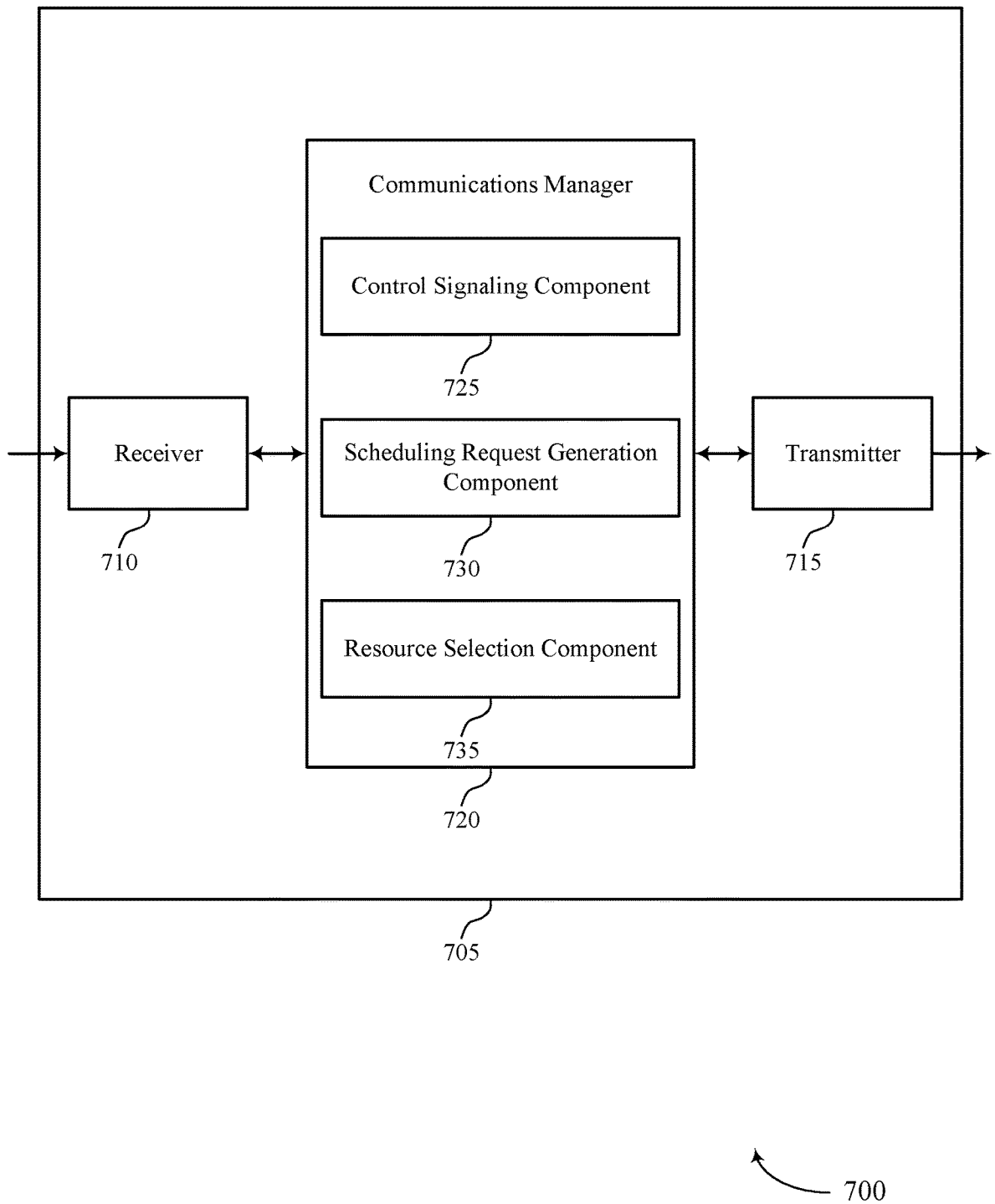

FIG. 7 shows a block diagram 700 of a device 705 that supports uplink control channel resource selection for scheduling request transmission in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink control channel resource selection for scheduling request transmission). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink control channel resource selection for scheduling request transmission). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of uplink control channel resource selection for scheduling request transmission as described herein. For example, the communications manager 720 may include a control signaling component 725, a scheduling request generation component 730, a resource selection component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The control signaling component 725 may be configured as or otherwise support a means for receiving control signaling that indicates a first scheduling request resource on a first cell and a second scheduling request resource on a second cell. The scheduling request generation component 730 may be configured as or otherwise support a means for generating a scheduling request at the UE, where both the first scheduling request resource on the first cell and the second scheduling request resource on the second cell are applicable to the scheduling request. The resource selection component 735 may be configured as or otherwise support a means for selecting the first scheduling request resource for transmission of the scheduling request on the first cell based on one or more of: a power mode of the UE, a signal metric associated with the first cell, or a numerology of the first cell. The scheduling request generation component 730 may be configured as or otherwise support a means for transmitting the scheduling request via the first scheduling request resource on the first cell based on the selecting.

Figure 8:
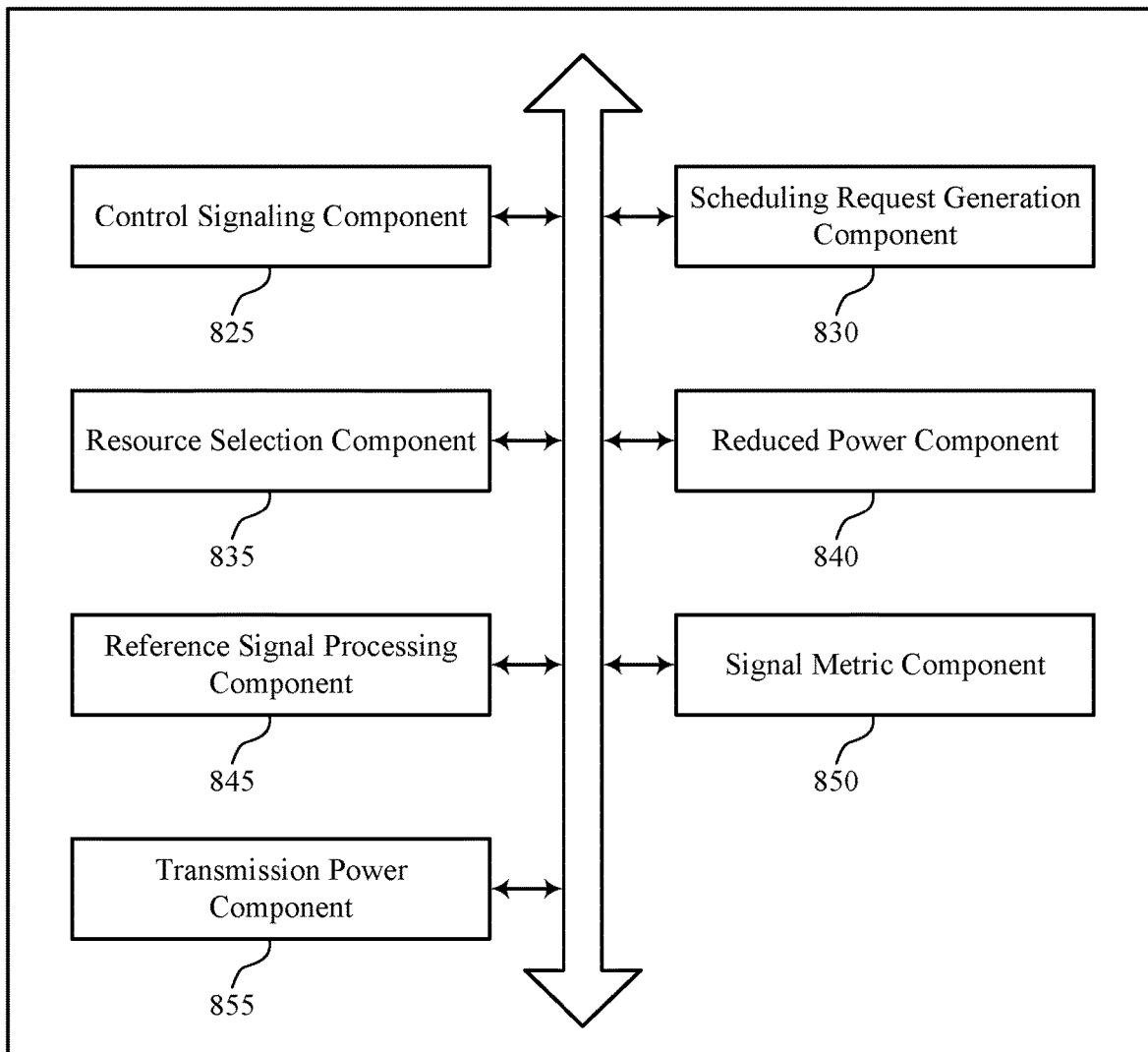
FIG. 8 shows a block diagram of a communications manager that supports uplink control channel resource selection for scheduling request transmission in accordance with one or more aspects of the present disclosure.

FIG. 8 shows a block diagram 800 of a communications manager 820 that supports uplink control channel resource selection for scheduling request transmission in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink control channel resource selection for scheduling request transmission as described herein. For example, the communications manager 820 may include a control signaling component 825, a scheduling request generation component 830, a resource selection component 835, a reduced power component 840, a reference signal processing component 845, a signal metric component 850, a transmission power component 855, or any combination thereof. Each of these components may communicate, directly or indirectly, with one another (e.g., via one or more buses).

The communications manager 820 may support wireless communication at a UE in accordance with examples as disclosed herein. The control signaling component 825 may be configured as or otherwise support a means for receiving control signaling that indicates a first scheduling request resource on a first cell and a second scheduling request resource on a second cell. The scheduling request generation component 830 may be configured as or otherwise support a means for generating a scheduling request at the UE, where both the first scheduling request resource on the first cell and the second scheduling request resource on the second cell are applicable to the scheduling request. The resource selection component 835 may be configured as or otherwise support a means for selecting the first scheduling request resource for transmission of the scheduling request on the first cell based on one or more of: a power mode of the UE, a signal metric associated with the first cell, or a numerology of the first cell. In some examples, the scheduling request generation component 830 may be configured as or otherwise support a means for transmitting the scheduling request via the first scheduling request resource on the first cell based on the selecting.

In some examples, the reduced power component 840 may be configured as or otherwise support a means for operating in a reduced power mode, where selecting the first scheduling request resource may be based on operating in the reduced power mode. In some examples, to support selecting the first scheduling request resource, the resource selection component 835 may be configured as or otherwise support a means for selecting the first scheduling request resource based on a type of the first cell associated with the first scheduling request resource. In some examples, the type of the first cell is an SpCell. In some examples, selecting the first scheduling request resource is based on the type of the first cell being the SpCell.

In some examples, to support selecting the first scheduling request resource, the resource selection component 835 may be configured as or otherwise support a means for selecting the first scheduling request resource based on the signal metric associated with the first cell being greater than a second signal metric associated with the second cell.

In some examples, the reference signal processing component 845 may be configured as or otherwise support a means for receiving one or more reference signals via the first cell and the second cell. In some examples, the signal metric component 850 may be configured as or otherwise support a means for measuring the signal metric associated with the first cell and the second signal metric associated with the second cell based on the one or more reference signals, where selecting the first scheduling request resource may be based on the measuring.

In some examples, to support transmitting the scheduling request, the transmission power component 855 may be configured as or otherwise support a means for transmitting the scheduling request according to a first transmission power, the first transmission power based on a value of the signal metric. In some examples, the signal metric and the second signal metric include RSRP metrics.

In some examples, to support selecting the first scheduling request resource, the resource selection component 835 may be configured as or otherwise support a means for selecting the first scheduling request resource based on the numerology of the first cell being greater than or equal to a numerology of the second cell (e.g., a respective SCS of each cell). In some examples, the numerology of the first cell and the numerology of the second cell may be equal and to support selecting the first scheduling request resource, the resource selection component 835 may be configured as or otherwise support a means for selecting the first scheduling request resource based on a type of the first cell.

In some examples, the first scheduling request resource and the second scheduling request resource may be at least partially overlapping in time. In some examples, the first scheduling request resource and the second scheduling request resource may be non-overlapping in time.

In some examples, the control signaling indicates a same scheduling request ID for the first scheduling request resource and the second scheduling request resource. In some examples, generating the scheduling request is based on the same scheduling request ID. In some examples, the selecting is based on both the first scheduling request resource and the second scheduling request resource being associated with the same scheduling request ID as the scheduling request.

Figure 9:
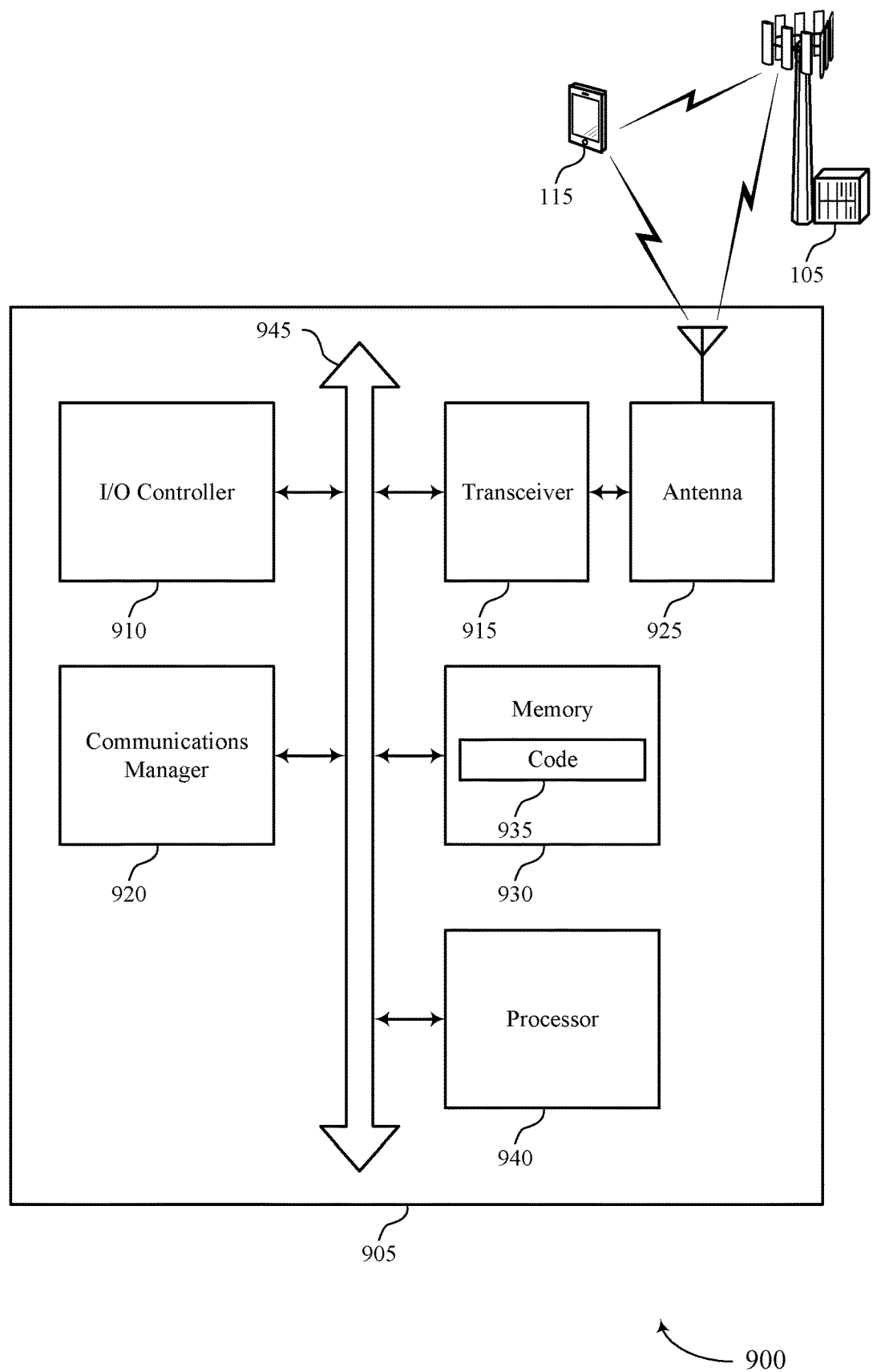
FIG. 9 shows a diagram of a system including a device that supports uplink control channel resource selection for scheduling request transmission in accordance with one or more aspects of the present disclosure.

FIG. 9 shows a diagram of a system 900 including a device 905 that supports uplink control channel resource selection for scheduling request transmission in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink control channel resource selection for scheduling request transmission). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control signaling that indicates a first scheduling request resource on a first cell and a second scheduling request resource on a second cell. The communications manager 920 may be configured as or otherwise support a means for generating a scheduling request at the UE, where both the first scheduling request resource on the first cell and the second scheduling request resource on the second cell are applicable to the scheduling request. The communications manager 920 may be configured as or otherwise support a means for selecting the first scheduling request resource for transmission of the scheduling request on the first cell based on one or more of: a power mode of the UE, a signal metric associated with the first cell, or a numerology of the first cell. The communications manager 920 may be configured as or otherwise support a means for transmitting the scheduling request via the first scheduling request resource on the first cell based on the selecting.

By including or configuring the communications manager 920 in accordance with examples as described herein, the device 905 may support techniques for improved communication reliability, reduced latency, reduced power consumption, more efficient utilization of communication resources, improved coordination between devices, and longer battery life, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of uplink control channel resource selection for scheduling request transmission as described herein, or the processor 940 and the memory 930 may be otherwise configured to perform or support such operations.

Figure 10:
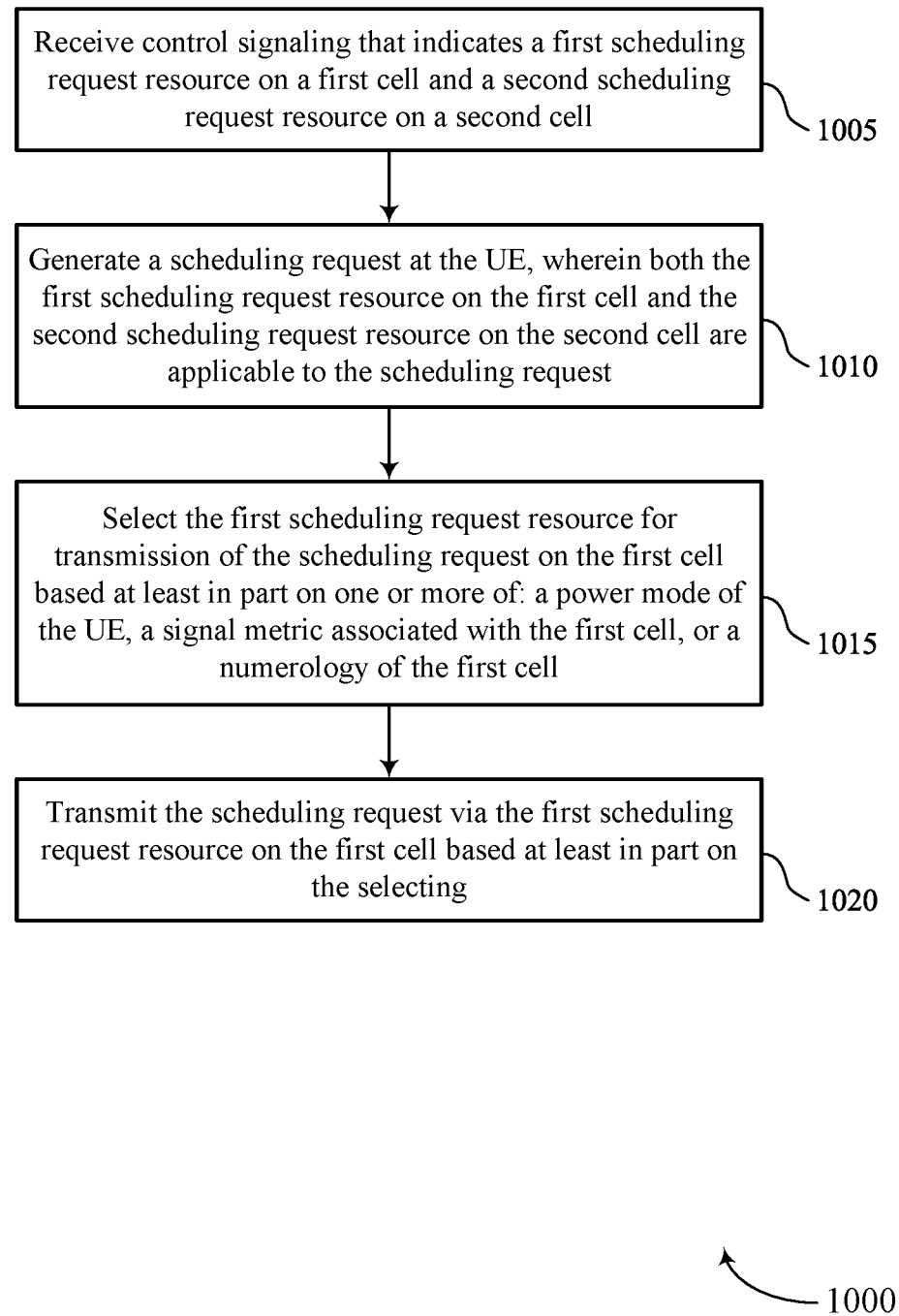
FIGS. 10 through 12 show flowcharts illustrating methods that support uplink control channel resource selection for scheduling request transmission in accordance with one or more aspects of the present disclosure.

FIG. 10 shows a flowchart illustrating a method 1000 that supports uplink control channel resource selection for scheduling request transmission in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving control signaling that indicates a first scheduling request resource on a first cell and a second scheduling request resource on a second cell. The operations of 1005 may be performed in accordance with examples as disclosed herein. In some examples, aspects of the operations of 1005 may be performed by a control signaling component 825 as described with reference to FIG. 8.

At 1010, the method may include generating a scheduling request at the UE, where both the first scheduling request resource on the first cell and the second scheduling request resource on the second cell are applicable to the scheduling request. The operations of 1010 may be performed in accordance with examples as disclosed herein. In some examples, aspects of the operations of 1010 may be performed by a scheduling request generation component 830 as described with reference to FIG. 8.

At 1015, the method may include selecting the first scheduling request resource for transmission of the scheduling request on the first cell based on one or more of: a power mode of the UE, a signal metric associated with the first cell, or a numerology of the first cell. The operations of 1015 may be performed in accordance with examples as disclosed herein. In some examples, aspects of the operations of 1015 may be performed by a resource selection component 835 as described with reference to FIG. 8.

At 1020, the method may include transmitting the scheduling request via the first scheduling request resource on the first cell based on the selecting. The operations of 1020 may be performed in accordance with examples as disclosed herein. In some examples, aspects of the operations of 1020 may be performed by a scheduling request generation component 830 as described with reference to FIG. 8.

Figure 11:
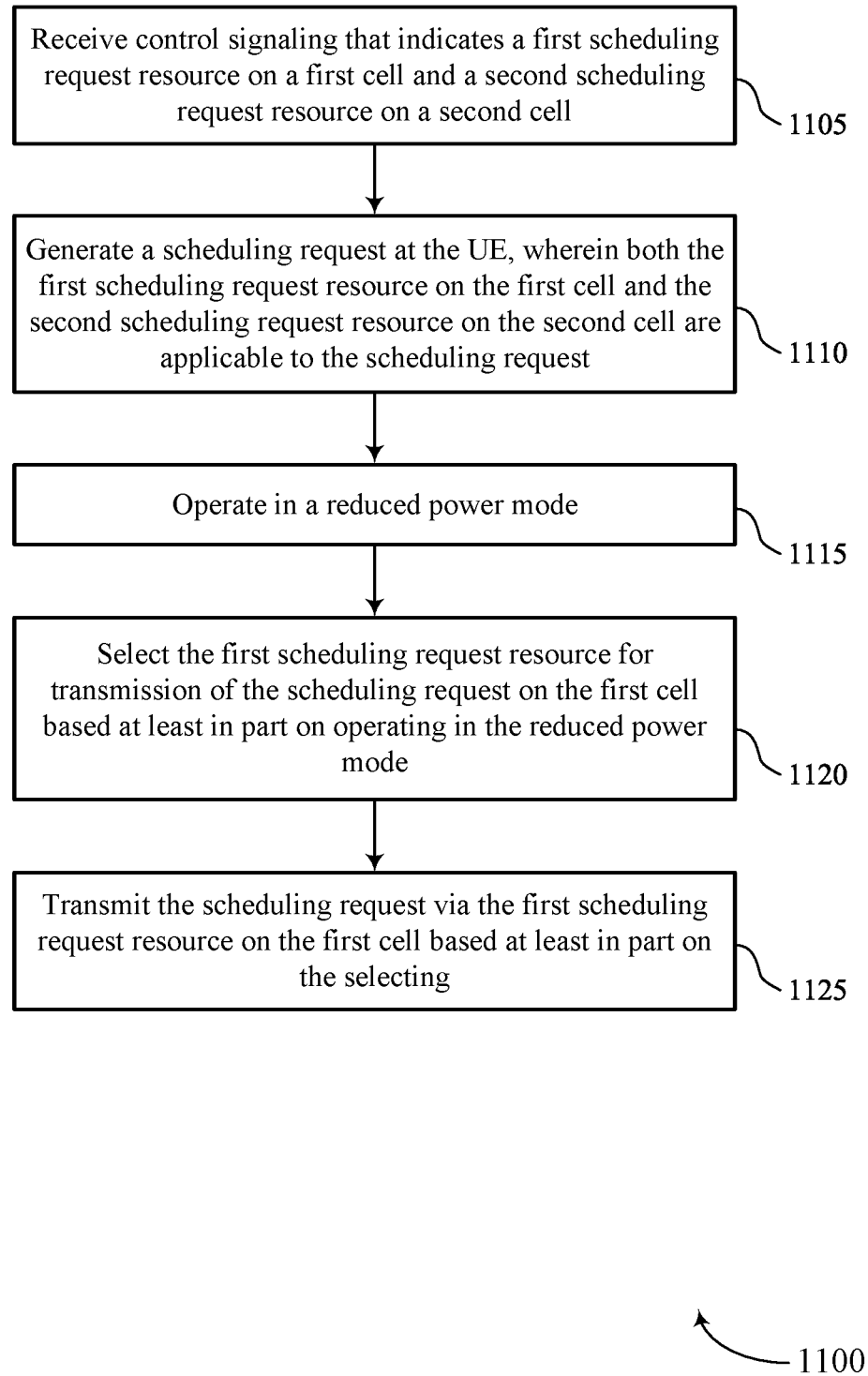

FIG. 11 shows a flowchart illustrating a method 1100 that supports uplink control channel resource selection for scheduling request transmission in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving control signaling that indicates a first scheduling request resource on a first cell and a second scheduling request resource on a second cell. The operations of 1105 may be performed in accordance with examples as disclosed herein. In some examples, aspects of the operations of 1105 may be performed by a control signaling component 825 as described with reference to FIG. 8.

At 1110, the method may include generating a scheduling request at the UE, where both the first scheduling request resource on the first cell and the second scheduling request resource on the second cell are applicable to the scheduling request. The operations of 1110 may be performed in accordance with examples as disclosed herein. In some examples, aspects of the operations of 1110 may be performed by a scheduling request generation component 830 as described with reference to FIG. 8.

At 1115, the method may include operating in a reduced power mode. In some aspects, the UE may switch to operating in the reduced power mode, or the UE may continue operating in the reduced power mode. The operations of 1115 may be performed in accordance with examples as disclosed herein. In some examples, aspects of the operations of 1115 may be performed by a reduced power component 840 as described with reference to FIG. 8.

At 1120, the method may include selecting the first scheduling request resource for transmission of the scheduling request on the first cell based on the UE operating in the reduced power mode. The operations of 1120 may be performed in accordance with examples as disclosed herein. In some examples, aspects of the operations of 1120 may be performed by a resource selection component 835 as described with reference to FIG. 8.

At 1125, the method may include transmitting the scheduling request via the first scheduling request resource on the first cell based on the selecting. The operations of 1125 may be performed in accordance with examples as disclosed herein. In some examples, aspects of the operations of 1125 may be performed by a scheduling request generation component 830 as described with reference to FIG. 8.

Figure 12:
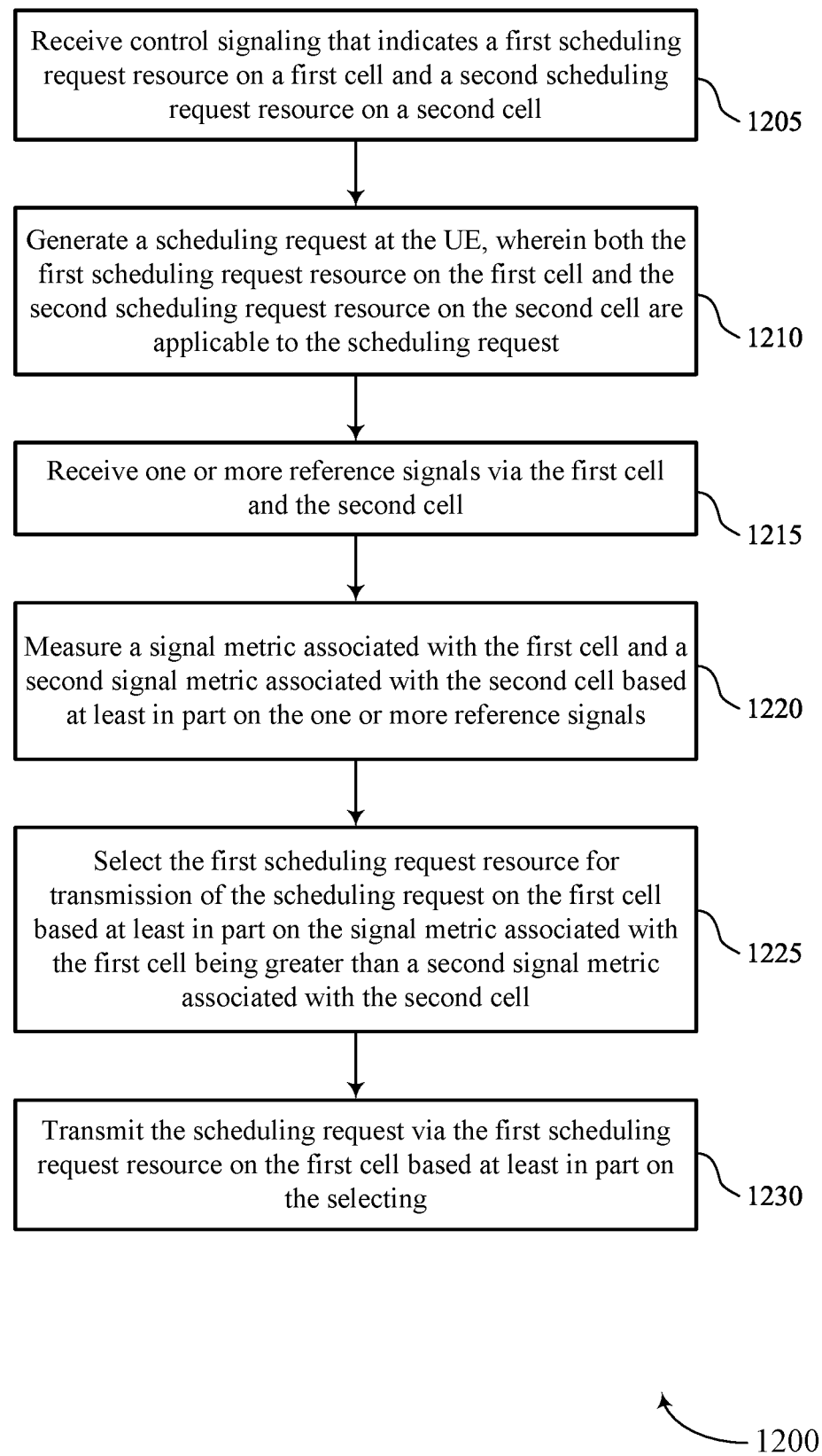

FIG. 12 shows a flowchart illustrating a method 1200 that supports uplink control channel resource selection for scheduling request transmission in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving control signaling that indicates a first scheduling request resource on a first cell and a second scheduling request resource on a second cell. The operations of 1205 may be performed in accordance with examples as disclosed herein. In some examples, aspects of the operations of 1205 may be performed by a control signaling component 825 as described with reference to FIG. 8.

At 1210, the method may include generating a scheduling request at the UE, where both the first scheduling request resource on the first cell and the second scheduling request resource on the second cell are applicable to the scheduling request. The operations of 1210 may be performed in accordance with examples as disclosed herein. In some examples, aspects of the operations of 1210 may be performed by a scheduling request generation component 830 as described with reference to FIG. 8.

At 1215, the method may include receiving one or more reference signals via the first cell and the second cell. The operations of 1215 may be performed in accordance with examples as disclosed herein. In some examples, aspects of the operations of 1215 may be performed by a reference signal processing component 845 as described with reference to FIG. 8.

At 1220, the method may include measuring a signal metric associated with the first cell and a second signal metric associated with the second cell based on the one or more reference signals. The operations of 1220 may be performed in accordance with examples as disclosed herein. In some examples, aspects of the operations of 1220 may be performed by a signal metric component 850 as described with reference to FIG. 8.

At 1225, the method may include selecting the first scheduling request resource for transmission of the scheduling request on the first cell based on the signal metric associated with the first cell being greater than a second signal metric associated with the second cell. The operations of 1225 may be performed in accordance with examples as disclosed herein. In some examples, aspects of the operations of 1225 may be performed by a resource selection component 835 as described with reference to FIG. 8.

At 1230, the method may include transmitting the scheduling request via the first scheduling request resource on the first cell based on the selecting. The operations of 1230 may be performed in accordance with examples as disclosed herein. In some examples, aspects of the operations of 1230 may be performed by a scheduling request generation component 830 as described with reference to FIG. 8.

The following provides an overview of aspects of the present disclosure:

Aspect 1: A method for wireless communication at a UE, comprising: receiving control signaling that indicates a first scheduling request resource on a first cell and a second scheduling request resource on a second cell; generating a scheduling request at the UE, wherein both the first scheduling request resource on the first cell and the second scheduling request resource on the second cell are applicable to the scheduling request; selecting the first scheduling request resource for transmission of the scheduling request on the first cell based at least in part on one or more of: a power mode of the UE, a signal metric associated with the first cell, or a numerology of the first cell; and transmitting the scheduling request via the first scheduling request resource on the first cell based at least in part on the selecting.

Aspect 2: The method of aspect 1, further comprising: operating in a reduced power mode, wherein selecting the first scheduling request resource is based at least in part on operating in the reduced power mode.

Aspect 3: The method of aspect 2, wherein selecting the first scheduling request resource comprises: selecting the first scheduling request resource based at least in part on a type of the first cell associated with the first scheduling request resource.

Aspect 4: The method of aspect 3, wherein the type of the first cell is an SpCell; and selecting the first scheduling request resource is based at least in part on the type of the first cell being the SpCell.

Aspect 5: The method of aspect 1, wherein selecting the first scheduling request resource comprises: selecting the first scheduling request resource based at least in part on the signal metric associated with the first cell being greater than a second signal metric associated with the second cell.

Aspect 6: The method of aspect 5, further comprising: receiving one or more reference signals via the first cell and the second cell; and measuring the signal metric associated with the first cell and the second signal metric associated with the second cell based at least in part on the one or more reference signals, wherein selecting the first scheduling request resource is based at least in part on the measuring.

Aspect 7: The method of any of aspects 5 through 6, wherein transmitting the scheduling request comprises: transmitting the scheduling request according to a first transmission power, the first transmission power based at least in part on a value of the signal metric.

Aspect 8: The method of any of aspects 5 through 7, wherein the signal metric and the second signal metric comprise RSRP metrics.

Aspect 9: The method of aspect 1, wherein selecting the first scheduling request resource comprises: selecting the first scheduling request resource based at least in part on the numerology of the first cell being greater than or equal to a numerology of the second cell.

Aspect 10: The method of aspect 9, wherein the numerology of the first cell and the numerology of the second cell are equal, and wherein selecting the first scheduling request resource comprises: selecting the first scheduling request resource based at least in part on a type of the first cell.

Aspect 11: The method of any of aspects 1 through 10, wherein the first scheduling request resource and the second scheduling request resource are at least partially overlapping in time.

Aspect 12: The method of any of aspects 1 through 10, wherein the first scheduling request resource and the second scheduling request resource are non-overlapping in time.

Aspect 13: The method of any of aspects 1 through 12, wherein: the control signaling indicates a same scheduling request ID for the first scheduling request resource and the second scheduling request resource; generating the scheduling request is based at least in part on the same scheduling request ID; and the selecting is based at least in part on both the first scheduling request resource and the second scheduling request resource being associated with the same scheduling request ID as the scheduling request.

Aspect 14: An apparatus for wireless communication at a UE, comprising a processor; memory coupled with the processor; and instructions stored in the memory and executable by the processor to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and operable to execute the code to cause the UE to:
      receive control signaling that indicates a first scheduling request resource on a first cell and a second scheduling request resource on a second cell;
      generate a scheduling request at the UE, wherein both the first scheduling request resource on the first cell and the second scheduling request resource on the second cell are applicable to the scheduling request;
      select the first scheduling request resource for transmission of the scheduling request on the first cell based at least in part on one or more of: a power mode of the UE, a signal metric associated with the first cell, or a numerology of the first cell; and
      transmit the scheduling request via the first scheduling request resource on the first cell based at least in part on the selecting.

2. The UE of claim 1, wherein the one or more processors are further operable to execute the code to cause the UE to:
   operate in a reduced power mode, wherein selecting the first scheduling request resource is based at least in part on operating in the reduced power mode.

3. The UE of claim 2, wherein, to select the first scheduling request resource, the one or more processors are operable to execute the code to cause the UE to:
   select the first scheduling request resource based at least in part on a type of the first cell associated with the first scheduling request resource.

4. The UE of claim 3, wherein:
   the type of the first cell is a primary cell of a master or secondary cell group; and
   selecting the first scheduling request resource is based at least in part on the type of the first cell being the primary cell of the master or secondary cell group.

5. The UE of claim 1, wherein, to select the first scheduling request resource, the one or more processors are operable to execute the code to cause the UE to:
   select the first scheduling request resource based at least in part on the signal metric associated with the first cell being greater than a second signal metric associated with the second cell.

6. The UE of claim 5, wherein the one or more processors are further operable to execute the code to cause the UE to:
receive one or more reference signals via the first cell and the second cell; and
measure the signal metric associated with the first cell and the second signal metric associated with the second cell based at least in part on the one or more reference signals, wherein selecting the first scheduling request resource is based at least in part on the measuring.

7. The UE of claim 5, wherein, to transmit the scheduling request, the one or more processors are operable to execute the code to cause the UE to:
transmit the scheduling request according to a first transmission power, the first transmission power based at least in part on a value of the signal metric.

8. The UE of claim 5, wherein the signal metric and the second signal metric comprise reference signal received power metrics.

9. The UE of claim 1, wherein, to select the first scheduling request resource, the one or more processors are operable to execute the code to cause the UE to:
select the first scheduling request resource based at least in part on the numerology of the first cell being greater than or equal to a numerology of the second cell.

10. The UE of claim 9, wherein the numerology of the first cell and the numerology of the second cell are equal, and wherein the one or more processors are further operable to execute the code to cause the UE to:
select the first scheduling request resource based at least in part on a type of the first cell.

11. The UE of claim 1, wherein the first scheduling request resource and the second scheduling request resource are at least partially overlapping in time.

12. The UE of claim 1, wherein the first scheduling request resource and the second scheduling request resource are non-overlapping in time.

13. The UE of claim 1, wherein:
the control signaling indicates a same scheduling request identifier for the first scheduling request resource and the second scheduling request resource;
generating the scheduling request is based at least in part on the same scheduling request identifier; and
the selecting is based at least in part on both the first scheduling request resource and the second scheduling request resource being associated with the same scheduling request identifier as the scheduling request.

14. A method for wireless communication at a user equipment (UE), comprising:
receiving control signaling that indicates a first scheduling request resource on a first cell and a second scheduling request resource on a second cell;
generating a scheduling request at the UE, wherein both the first scheduling request resource on the first cell and the second scheduling request resource on the second cell are applicable to the scheduling request;
selecting the first scheduling request resource for transmission of the scheduling request on the first cell based at least in part on one or more of: a power mode of the UE, a signal metric associated with the first cell, or a numerology of the first cell; and
transmitting the scheduling request via the first scheduling request resource on the first cell based at least in part on the selecting.

15. The method of claim 14, further comprising:
operating in a reduced power mode, wherein selecting the first scheduling request resource is based at least in part on operating in the reduced power mode.

16. The method of claim 15, wherein selecting the first scheduling request resource comprises:
selecting the first scheduling request resource based at least in part on a type of the first cell associated with the first scheduling request resource.

17. The method of claim 16, wherein:
the type of the first cell is a primary cell of a master or secondary cell group; and
selecting the first scheduling request resource is based at least in part on the type of the first cell being the primary cell of the master or secondary cell group.

18. The method of claim 14, wherein selecting the first scheduling request resource comprises:
selecting the first scheduling request resource based at least in part on the signal metric associated with the first cell being greater than a second signal metric associated with the second cell.

19. The method of claim 18, further comprising:
receiving one or more reference signals via the first cell and the second cell; and
measuring the signal metric associated with the first cell and the second signal metric associated with the second cell based at least in part on the one or more reference signals, wherein selecting the first scheduling request resource is based at least in part on the measuring.

20. The method of claim 18, wherein transmitting the scheduling request comprises:
transmitting the scheduling request according to a first transmission power, the first transmission power based at least in part on a value of the signal metric.

21. The method of claim 18, wherein the signal metric and the second signal metric comprise reference signal received power metrics.

22. The method of claim 14, wherein selecting the first scheduling request resource comprises:
selecting the first scheduling request resource based at least in part on the numerology of the first cell being greater than or equal to a numerology of the second cell.

23. The method of claim 22, wherein the numerology of the first cell and the numerology of the second cell are equal, and wherein selecting the first scheduling request resource comprises:
selecting the first scheduling request resource based at least in part on a type of the first cell.

24. The method of claim 14, wherein the first scheduling request resource and the second scheduling request resource are at least partially overlapping in time.

25. The method of claim 14, wherein the first scheduling request resource and the second scheduling request resource are non-overlapping in time.

26. The method of claim 14, wherein:
the control signaling indicates a same scheduling request identifier for the first scheduling request resource and the second scheduling request resource;
generating the scheduling request is based at least in part on the same scheduling request identifier; and
the selecting is based at least in part on both the first scheduling request resource and the second scheduling request resource being associated with the same scheduling request identifier as the scheduling request.

27. An apparatus for wireless communication at a user equipment (UE), comprising:
means for receiving control signaling that indicates a first scheduling request resource on a first cell and a second scheduling request resource on a second cell;

means for generating a scheduling request at the UE, wherein both the first scheduling request resource on the first cell and the second scheduling request resource on the second cell are applicable to the scheduling request;

means for selecting the first scheduling request resource for transmission of the scheduling request on the first cell based at least in part on one or more of: a power mode of the UE, a signal metric associated with the first cell, or a numerology of the first cell; and means for transmitting the scheduling request via the first scheduling request resource on the first cell based at least in part on the selecting.

28. The apparatus of claim 27, further comprising:

means for operating in a reduced power mode, wherein selecting the first scheduling request resource is based at least in part on operating in the reduced power mode.

29. The apparatus of claim 28, wherein the means for selecting the first scheduling request resource comprise:

means for selecting the first scheduling request resource based at least in part on a type of the first cell associated with the first scheduling request resource.

30. A non-transitory computer-readable medium storing code for wireless communication at a user equipment (UE), the code comprising instructions executable by one or more processors to:

receive control signaling that indicates a first scheduling request resource on a first cell and a second scheduling request resource on a second cell;

generate a scheduling request at the UE, wherein both the first scheduling request resource on the first cell and the second scheduling request resource on the second cell are applicable to the scheduling request;

select the first scheduling request resource for transmission of the scheduling request on the first cell based at least in part on one or more of: a power mode of the UE, a signal metric associated with the first cell, or a numerology of the first cell; and transmit the scheduling request via the first scheduling request resource on the first cell based at least in part on the selecting.

\* \* \* \* \*